US008750502B2

(12) United States Patent
Kirkpatrick et al.

(10) Patent No.: US 8,750,502 B2
(45) Date of Patent: Jun. 10, 2014

(54) SYSTEM ON CHIP AND METHOD FOR CRYPTOGRAPHY USING A PHYSICALLY UNCLONABLE FUNCTION

(75) Inventors: Michael S. Kirkpatrick, Harrisonburg, VA (US); Samuel Kerr, Cincinnati, OH (US); Elisa Bertino, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 78 days.

(21) Appl. No.: 13/427,589

(22) Filed: Mar. 22, 2012

(65) Prior Publication Data

US 2013/0254636 A1 Sep. 26, 2013

(51) Int. Cl.
*G06F 21/00* (2013.01)
(52) U.S. Cl.
USPC ....... 380/44; 713/189; 714/768; 714/E11.042
(58) Field of Classification Search
USPC ........................................................ 713/189
See application file for complete search history.

(56) References Cited

U.S. PATENT DOCUMENTS

| 8,254,571 B1* | 8/2012 | Boyen | 380/44 |
| 8,516,269 B1* | 8/2013 | Hamlet et al. | 713/189 |
| 2006/0209584 A1* | 9/2006 | Devadas et al. | 365/52 |
| 2008/0279373 A1* | 11/2008 | Erhart et al. | 380/46 |
| 2010/0031065 A1* | 2/2010 | Futa et al. | 713/194 |
| 2012/0179952 A1* | 7/2012 | Tuyls et al. | 714/768 |
| 2012/0183135 A1* | 7/2012 | Paral et al. | 380/44 |
| 2012/0290845 A1* | 11/2012 | Bares et al. | 713/170 |
| 2012/0324310 A1* | 12/2012 | Oshida et al. | 714/755 |

OTHER PUBLICATIONS

M. J. Atallah, E. D. Bryant, J. T. Korb, and J. R. Rice. Binding software to specific native hardware in a VM environment: The PUF challenge and opportunity. In VMSEC '08. ACM, 2008.
B, Danev, T. S. Heydt-Benjamin, and S. Capkun. Physical-layer identification of RFID devices. In Proceedings of the USENIX Security Symposium, 2009.
S. Devadas, E. Suh, S. Paral, R. Sowell, T. Ziola, and V. Khandelwal. Design and implementation of PUF-based "unclonable" RFID ICs for anti-counterfeiting and security applications. In 2008 IEEE International Conference on RFID, pp. 58-64, 2008.
K. B. Frikken, M. Blanton, and M. J. Atallah, Robust authentication using physically unclonable functions. In Information Security Conference (ISC), Sep. 2009.
B. Gassend, D. Clarke, M. van Dijk, and S. Devadas. Controlled physical random functions. In Proceedings of the 18th Annual Computer Security Applications Conference (ACSAC), 2002.

(Continued)

*Primary Examiner* — Hadi Armouche
*Assistant Examiner* — Bryan Wright
(74) *Attorney, Agent, or Firm* — Ice Miller LLP

(57) ABSTRACT

A system and method for performing cryptographic functions in hardware using read-N keys comprising a cryptographic core, seed register, physically unclonable function (PUF), an error-correction core, a decryption register, and an encryption register. The PUF configured to receive a seed value as an input to generate a key as an output. The error-correction core configured to transmit the key to the cryptographic core. The encryption register and decryption register configured to receive the seed value and the output. The system, a PUF ROK, configured to generate keys that are used N times to perform cryptographic functions.

20 Claims, 10 Drawing Sheets

(56) References Cited

OTHER PUBLICATIONS

B. Gassend, D. Clarke, M. van Dijk, and S. Devadas. Silicon physical random functions. In Proceedings of the 9th ACM Conference on Computer and Communications Security (CCS '02), 2002.
S, Goldwasser, Y. T. Kalai, and G. N. Rothblum. One-time programs. In CRYPTO 2008, pp. 39-56, 2008.
J. Guajardo, S. S, Kumar, G.-J, Schrijen, and P. Tuyls. FPGA intrinsic PUFs and their use for IP protection. In Proceedings of the 9th Cryptographic Hardware and Embedded Systems Workshop (CHES), pp. 63-80, 2007.
J. Guajardo, S. S. Kumar, G.-J. Schrijen, and P. Tuyls. Physical unclonable functions and public-key crypto for FPGA IP protection. In International Conference on Field Programmable Logic and Applications, pp. 189-195, 2007.
M. Kirkpatrick and E. Bertino, Physically restricted authentication with trusted hardware. In the Fourth Annual Workshop on Scalable Trusted Computing (ACM STC '09), Nov. 2009.
K. Lofstrom, W. Daasch, and D. Taylor. IC identification circuit using device mismatch. In Solid-State Circuits Conference, 2000, Digest of Technical Papers. ISSCC, 2000 IEEE International, pp. 372-373, 2000.
M. Riley and I. Richardson. Reed-solomon codes. http://www.cs.cmu.edu/afs/cs.cmu.edu/project/ pscico-guyb/realworld/www/reedsolomon/reed_solomon_codes.html, 1998. Printed from Website on Jun. 7, 2012.
G. E. Suh and S. Devadas. Physcal unclonable functions for device authentication and secret key generation. In Proceedings of the 44th IEEE Design Automation Conference (DAC), pp. 9-14. IEEE Press, 2007.
G. E. Suh, C. W. O'Donnell, and S. Devadas. AEGIS: A single-chip secure processor. In Elsevier Information Security Technical Report, vol. 10, pp. 63-73, 2005.
G. E. Suh, C. W. O'Donnell, and S. Devadas. Aegis: A single-chip secure processor. IEEE Design and Test of Computers, 24(6):570-580, 2007.
Polarssl: Small cryptographic library. http://www.polarssl.org/, 2008.
Encryption for ARM MCUs. http://ics.nxp.com/ literature/presentations/microcontrollers/pdf/nxp,security.innovation.encryption.pdf, 2010. Printed off Website Jun. 7, 2012.
KNJN FPGA development boards. http://www.knjn.com/FPGA-FX2.html, 2010.
A. Akavia, S. Goldwasser, and V. Vaikuntanathan. Simultaneous hardcore bits and cryptography against memory attacks. In TCC '09: Proceedings of the 6th Theory of Cryptography Conference on Theory of Cryptography, pp. 474-495, Berlin, Heidelberg, 2009. Springer-Verlag.
B. Barak, O. Goldreich, R. Impagliazzo, S. Rudich, A. Sahai, S. Vadhan, and K. Yang. On the (im)possibility of obfuscating programs. In Lecture Notes in Computer Science, pp. 1-18. Springer-Verlag, 2001.
A. Berzati, C. Canovas, J.-G. Dumas, and L. Goubin. Fault attacks on RSA public keys: Left-to-right implementations are also vulnerable. In CT-RSA '09: Proceedings of the The Cryptographers' Track at the RSA Conference 2009 on Topics in Cryptology, pp. 414-428, Berlin, Heidelberg, 2009. Springer-Verlag.
A. Berzati, C. Canovas, and L. Goubin. In(security) against fault injection attacks for CRT-RSA implementations. Fault Diagnosis and Tolerance in Cryptography, Workshop on, 0:101-107, 2008.
A. Berzati, C. Canovas, and L. Goubin. Perturbating RSA public keys: An improved attack. In E. Oswald and P. Rohatgi, editors, Cryptographic Hardware and Embedded Systems (CHES 2008), vol. 5154 of Lecture Notes in Computer Science, pp. 380-395. Springer Berlin / Heidelberg, 2008.
E. Brier, B. Chevallier-mames, M. Clef, C. Clavier, and École Normale Supérieure, Why one should also secure RSA public key elements. In Cryptographic Hardware and Embedded Systems (CHES 2006), vol. 4249 of Lecture Notes in Computer Science, pp. 324-338. Springer-Verlag, 2006.
R. Geambasu, T. Kohno, A. Levy, and H. M. Levy. Vanish: Increasing data privacy with self-destructing data. In Proc. of the 18th USENIX Security Symposium, 2009.
V. Goyal, Y. Ishai, A. Sahel, R. Venkatesan, and A. Wadia. Founding cryptography on tamper-proof hardware tokens. In D. Micciancio, editor, Theory of Cryptography, vol. 5978 of Lecture Notes in Computer Science, pp. 308-326. Springer Berlin / Heidelberg, 2010.
M. S. Kirkpatrick and S. Kerr. Enforcing physically restricted access control for remote data, In 1st ACM Conference on Data and Application Security and Privacy (CODASPY), Feb. 2011.
M. S. Kirkpatrick, S. Kerr, and E. Bertino. PUF ROKs: Generating read-once keys with physically unclonable functions (extended abstract). In 6th Annual Cyber Security and Information Intelligence Research Workshop CSIIRW), Apr. 2010.
N. Koblitz. Elliptic curve cryptosystems. Mathematics of Computation, pp. 203-209, 1987.
P. Kocher, J. Jaffe, and B. Jun. Introduction to differential power analysis and related attacks. Technical report, Cryptography Research, 1998.
V. Kolesnikov, Truly efficient string oblivious transfer using resettable tamper-proof tokens. In TCC, pp. 327-342, 2010.
S. Narayanan, A. Raghunathan, and R. Venkatesan. Obfuscating straight line arithmetic programs, In DRM '09: Proceedings of the nineth ACM workshop on Digital rights management, pp. 47-58, New York, NY, USA, 2009. ACM.
A. Pellegrini, V. Bertacco, and T. Austin. Fault-based attack of RSA authentication. In Design Automation and Test in Europe (DATE), Mar. 2010.
S. Rockliff. The error correcting codes (ecc) page. http://www.eccpage.com/, 2008.
L. F. G. Sarmenta, M. van Dijk, C. W. O'Donnell, J. Rhodes, and S. Devadas, Virtual monotonic counters and count-limited objects using a tpm without a trusted os. In STC '06: Proceedings of the first ACM workshop on Scalable trusted computing, pp. 27-42, New York, NY, USA, 2006. ACM.
V. Sundaresan, S. Rammohan, and R. Vemuri. Defense against side-channel power analysis attacks on microelectronic systems, pp. 144-150, Jul. 2008.

\* cited by examiner

SYSTEM ON CHIP AND METHOD FOR CRYPTOGRAPHY USING A PHYSICALLY UNCLONABLE FUNCTION

BACKGROUND

In the digital age, securing communications, documents, software, and other information from being disclosed to third parties is a critical component of many enterprises. Enterprises that transmit such information in the presence of potential adversaries may wish to delegate the authority to perform cryptographic functions to protect such information to employees within the enterprise, trusted third parties, or other entities for a specific number of cryptographic operations. Cryptographic functions may employ read-once keys (ROKs) to perform cryptographic functions that provide greater protection to encrypted information by only allowing such cryptographic functions to be performed a specific number of times.

The term ROK describes the notion that a cryptographic key can be read and used for encryption and decryption only once. While it seems intuitive that a trusted piece of software could be designed that deletes a key right after using it, such a scheme naïvely depends on the proper execution of the program. This approach could be easily circumvented by running the code within a debugging environment that halts execution of the code before the deletion occurs. That is, the notion of a ROK entails a stronger protection method wherein the process of reading the key results in its immediate destruction.

Cryptographers have proposed the notion of read-once keys (ROKs) as a beneficial tool for a number of applications, such as delegation of authority. The premise of ROKs is that the key is destroyed by the process of reading it, thus preventing subsequent accesses. The consensus among cryptographers is that ROKs cannot be produced by algorithmic processes alone. As such, there exists a need for a hardware-based system on chip and method for securely performing cryptographic functions using ROKs.

SUMMARY

The present disclosure includes disclosure of at least one system for cryptographic functions. In at least one embodiment of a system for cryptographic functions according to the present disclosure, a system for cryptographic functions according to the present disclosure comprises a cryptographic core; a seed register electronically coupled to the cryptographic core; a physically unclonable function (PUF) electronically coupled to the seed register, the PUF configured to receive a seed value as an input and to generate a key as an output; an error-correction core electronically coupled to the PUF and the cryptographic core, the error-correction core configured to receive the key as an input and to transmit the key to the cryptographic core; a decryption register electronically coupled to the error-correction core and the seed register, the decryption register being configured to receive the key from the error-correction core; and an encryption register electronically coupled to the error-correction core, the encryption register being configured to receive the key from the error-correction core. In an aspect of at least one embodiment of a system for cryptographic functions according to the present disclosure where an error-correction core is configured to generate an error-correction syndrome from the key, the system comprises an error-correction cache electronically coupled to the error-correction core, the error-correction cache configured to store the error correction syndrome. In an aspect of at least one embodiment of a system for cryptographic functions according to the present disclosure, a cryptographic core is configured to perform cryptographic functions. In an aspect of at least one embodiment of a system for cryptographic functions according to the present disclosure, a cryptographic core is electronically coupled to an external interface, and the cryptographic core configured to receive a message through the external interface, to perform a cryptographic function on the message using the key, and to send the message through the external interface. In an aspect of at least one embodiment of a system for cryptographic functions according to the present disclosure, a cryptographic core is configured to generate a hash using a key and to use the hash as a private key in symmetric cryptography. In at least one embodiment of a system for cryptographic functions according to the present disclosure, the system comprises a processing core electronically coupled to the cryptographic core, the processing core configured to send at least one input to the cryptographic core, the at least one input comprising a message, a cryptographic function, and an index value; a feedback circuit comprising the error-correction core, the decryption register, the encryption register, and the PUF, the feedback circuit configured to iteratively execute each component of the feedback circuit; and an index key, the index key generated by iteratively executing each component of the feedback circuit as many times as the index value; where the cryptographic core is configured to perform a cryptographic function on the message using the index key to generate a cryptographic message. In at least one embodiment of a system for cryptographic functions according to the present disclosure, the system comprises a buffer within a cryptographic core configured to combine a plurality of keys into a combined key; and a public key and a private key forming a key pair, wherein the cryptographic core is configured to generate the key pair using the combined key as input. In at least one embodiment of a system for cryptographic functions according to the present disclosure, the system comprises a digital signature comprising a communication signed by the private key, wherein the public key is configured to verify the authenticity of the digital signature through public key cryptography. In at least one embodiment of a system for cryptographic functions according to the present disclosure, the system is implemented on a single integrated circuit.

The present disclosure includes disclosure of at least one method for performing cryptographic functions. In at least one embodiment of a method for performing cryptographic functions according to the present disclosure, the method comprising the steps of receiving at least one encryption input, each at least one encryption input comprising an encrypt function and a message; performing an encryption key generation process for at least one encryption input, the encryption key generation process comprising the steps of providing a seed value to a physically unclonable function (PUF), generating an output value from the physically unclonable function (PUF) using the seed value, storing an error-correction syndrome generated from the output value, transmitting the output value to the cryptographic core, storing the output value in a plurality of registers, and updating an iteration counter. In at least one embodiment of a method for performing cryptographic functions according to the present disclosure, an encryption key generation process comprises the step of producing an encrypted message by executing the encrypt function on the message using the output value. In at least one embodiment of a method for performing cryptographic functions according to the present disclosure, the method comprises the step of repeating an encryption key generation process for each encryption input, wherein the output value of an iteration of the encryption key generation process is used as the seed value in a later iteration of the encryption key generation process. In at least one embodiment of a method for performing cryptographic functions according to the present disclosure, an error-correction syndrome is generated by applying a Reed-Solomon function. In at least one embodiment of a method for performing cryptographic functions according to the present disclosure, an encryption input comprises a private key generation request and the method comprises the steps of generating a private key using the output value; and producing an encrypted communication using the private key. In at least one embodiment of a method for performing cryptographic functions according to the present disclosure, the method comprises the steps of transmitting an encrypted communication; and decrypting the communication. In at least one embodiment of a method for performing cryptographic functions according to the present disclosure where an encryption input comprises a key-pair generation request, the method comprises the step of generating a public and private key pair using the output value.

In at least one embodiment of a method for performing cryptographic functions according to the present disclosure, the method comprises the steps of receiving at least one decryption input, each at least one decryption input comprising an encrypted message, a request to decrypt the encrypted message, and an index value; performing a decryption key generation process for each of the at least one decryption inputs, the decryption key generation process comprising the steps of providing a decryption seed value to a physically unclonable function (PUF), generating a first output value from the physically unclonable function (PUF) using the decryption seed value, using an error-correction syndrome to generate a second output value from the first output value, copying the second output value into a register, and updating an iteration counter. In at least one embodiment of a method for performing cryptographic functions according to the present disclosure, a decryption key generation process comprises the steps of comparing an index value to the updated iteration counter; and if the iteration counter is less than the index value, repeating the steps of providing a decryption seed value to a physically unclonable function (PUF), generating a first output value from the physically unclonable function (PUF) using the decryption seed value, using an error-correction syndrome to generate a second output value from the first output value, copying the second output value into a register, and updating an iteration counter. In at least one embodiment of a method for performing cryptographic functions according to the present disclosure, the method comprises the step of performing a decrypt function on an encrypted message using a second output value.

In at least one embodiment, the present disclosure comprises a method for delegating digital signatures using a hardware-based physically unclonable function (PUF). In at least one such embodiment, the method comprises the steps of setting an initial seed value for a PUF and a cryptographic processing core electronically coupled to the PUF; generating a candidate key from the PUF and the cryptographic processing core; using the candidate key to produce a public and private key pair in the cryptographic processing core; placing a digital signature on a communication using the private key in the cryptographic processing core; destroying the initial seed value and the private key in the cryptographic processing core; making the public key available to a recipient of the digitally signed communication; transferring the digitally signed communication to the recipient; verifying the authenticity of the digital signature on the communication using the public key.

DESCRIPTION

Figure 1A:
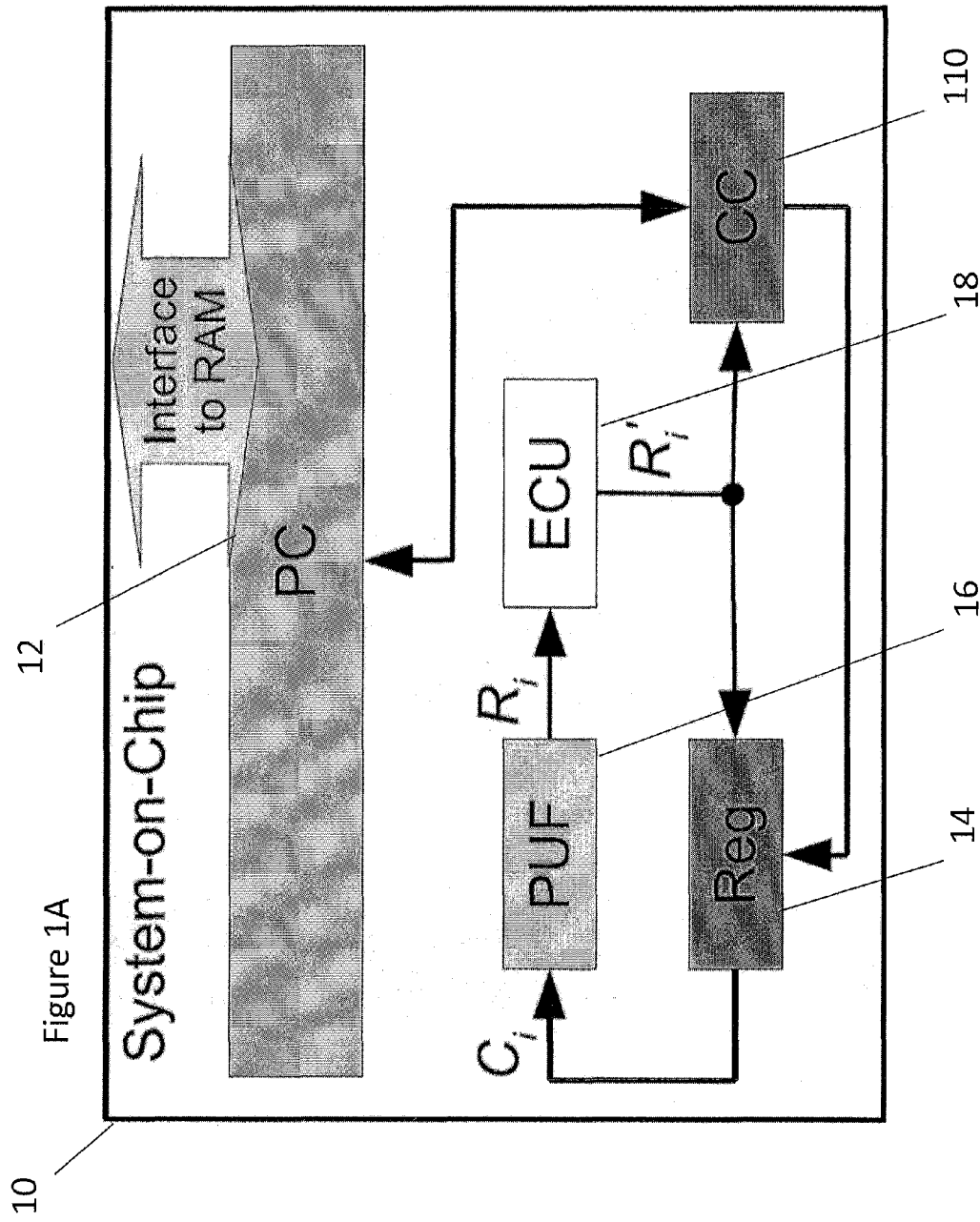
FIG. 1A shows a block diagram of an exemplary system on chip for cryptographic functions according to at least one embodiment of the present disclosure.

For the purpose of promoting an understanding of the principles of the present disclosure, reference will now be made to the variations and/or embodiments illustrated in the drawings, and specific language will be used to describe the same. It will nevertheless be understood that no limitation of the scope of this disclosure is thereby intended.

FIG. 1A shows a block diagram illustrating an exemplary system on chip for cryptographic functions according to at least one embodiment of the present disclosure. In at least one embodiment of the present disclosure, the system on chip 10 comprises a processing core 12, register 14, physically unclonable function (PUF) 16, error control unit 18, and cryptographic core 110.

In at least one embodiment of the present disclosure, the system on chip 10 comprises a PUF 16. PUFs use distinct instances of hardware produce distinct behavioral characteristics, like, for example, variations in the length and width of wire producing varying oscillations between ring oscillators in a PUF. That is, each copy of the device, even if designed to be identical, normally will exhibit slight variations that can be measured only during execution of the circuit. In addition to silicon-based circuits, similar distinguishing techniques have been applied to, for example, RFID devices.

Mathematically, a PUF can be modeled as a function PUF: $C \rightarrow R$, where C denotes a set of input challenges (usually encoded as a bit string) and R is a set of responses. That is, in at least one embodiment of the present disclosure, providing the same input Ci to the PUF 16 will yield approximately the same result Ri. Nevertheless, output from a PUF normally consists of noisy data. In an exemplary embodiment of the system on chip 10, an error control unit 18 performs an error-correcting code function, such as a Reed-Solomon function, so that the response from the PUF 16 is identical every time.

It should be appreciated that the definition of the PUF 16 function is determined exclusively by the variations in the PUF 16 hardware. As a result, no properties can be assumed about the function itself. That is, in general, the PUF 16 is neither linear nor injective nor subjective. Rather, the PUF 16 function merely consists of a set of random challenge and response pairs (Ci, Ri). Furthermore, as the PUF 16 function is defined by the hardware, providing the same Ci as input to two different PUFs 16 will produce two different responses $R'i \neq Ri$.

It should be appreciated that a ROK, according to the present disclosure, is based on an adaptation of Turing machines. In at least one embodiment of the present disclosure, define the machine T to be $$T = <Q, g_0, \delta, \Gamma, \iota>$$

where Q is the set of possible states, q0 is the initial state, $\delta$ defines the transition from one state to another based on processing the symbols $\Gamma$, given input $\iota$. For the sake of simplicity of the definition and not to limit the scope of the present disclosure, assume that $\iota$ only consists of messages to be encrypted or decrypted and ignore other types of input data. Thus, the definition of $\delta$ is determined by the execution of instructions $\gamma 1, \gamma 2, \ldots, \gamma 1$, where consuming $\gamma 1 \in \Gamma$ results in the transition from state qi to qi+1. Based on this formalism, the following primitives are evident.

The encrypt function $Enc(\gamma_i, q_i, m)$ encrypts the message $m \in \iota$ given the instruction $\gamma_1$ and the state $q_i$. The system then transitions to $q_{i+1}$ and produces the returned value as e(m) as a side effect.

The decrypt function $Dec(\gamma_1, q_j, e)$ decrypts the ciphertext $e \in \iota$ given the instruction $\gamma_j$ and the state $q_j$. If the decryption is successful, the function returns m. Otherwise, the return value is denoted $\emptyset$. The system then transitions to $q_{j+1}$.

Informally, $\gamma i$ and qi describe the current instruction and the contents of memory for a single execution of a program, and capture the state of the system just before executing the encrypt or decrypt primitive. That is, if the execution of the program is suspended for a brief time, $\gamma i$, qi would describe a snapshot of the stack, the value stored in the instruction pointer (IP) register, the values of all dynamically allocated variables (i.e., those on the heap), etc. In short, it would contain the full software image for that process for that precise moment in time. Once the program is resumed, the symbol $\gamma i$ would be consumed, and the system would transition to state qi+1.

A read-once key (ROK) is a cryptographic key K subject to the following conditions:

Each execution of the function $Enc(\gamma_i, q_i, m)$ generates a new K and yields a transition to a unique $q_{i+1}$.

The first execution of the function $Dec(\gamma_i, q_j, e)$ returns m and transitions to $q_{j+1}$. All subsequent executions return $\emptyset$ and transitions to $q'_{j+1}$, even when executing the machine $<Q, g_0, \delta, \Gamma, \iota>$ with e, except with negligible probability.

The probability of successfully decrypting e without the primitive $Dec(\gamma_j, q_j, e)$ is less than or equal to a security parameter $\epsilon$ ($0 < \epsilon < 1$), even when given identical initial states. $\epsilon$ must be no smaller than the probability of a successful attack on the cryptographic algorithms themselves.

It should be appreciated that the ROK Turing machine is non-deterministic. Specifically, during the first execution of a program that encrypts a message m, $\delta$ will define a transition from qi to qi+1 based on the function $Enc(\gamma i, qi, m)$. However, the second time, the key will be different, and the state transition will be from qi to q'i+1. Similarly, the first execution of a program that decrypts e(m) will traverse the states q0, ..., qj, qj+1, where qj+1 is the state that results from a successful decryption. However, returning the machine to its initial state q0, using the same instructions $\Gamma$, the state traversal will be q0, ..., qj, q'j+1$\neq$qj+1, because the decryption fails. Thus, ROKs incorporate at least one unpredictable element that does not exist in traditional Turing machines: the history of prior machine executions. That is, for any given machine T, only the first execution (assuming either the encrypt or decrypt primitive is executed) will use the transitions defined by $\delta$. The second (and subsequent) executions will use $\delta'$, as the state after the primitive is invoked will differ.

The foregoing definitions comprise the intuitive notion of a ROK. The key K is generated in an on-demand fashion in order to encrypt a message. Later, K can be used to decrypt the message, but only once. After the first decryption, the key is obliterated in some manner. Specifically, even if the contents of memory are returned to match the program state $\gamma j$, qj as it existed before the first call to $Dec(\gamma j, qj, e)$, the decryption will fail. The system on chip 10 according to at least one embodiment of the present disclosure provides this self-destructing property.

For example, observe that an adversary A may opt to attack the cryptographic algorithms themselves. In such an attack, the number of times the key K can be read by an authorized party is irrelevant: A is never authorized. If the cryptographic scheme is sufficiently weak, A may succeed in recovering the message (or the key itself). The ROK property offers no additional security against such an attack. For this reason, in at least one embodiment of the present disclosure, $\epsilon$ is no smaller than the probability of a successful attack on the cryptographic scheme employed.

In an exemplary embodiment of the present disclosure, there is a limit to the usage of a key by an authorized party to combat such an attack. Although the authorized party may become an adversary himself by attempting to recover the key K and subvert the system, the parameter $\epsilon$ offers a means to specify the system's defense against such an insider threat. It should be appreciated that for the most sensitive data, an implementation of the present disclosure could require a very low level of $\epsilon$, making the probability of subverting the ROK property equal to the probability of a brute-force attack on the cryptographic algorithm. In applications that are less sensitive (i.e., the ROK property is desirable, but not critically important), $\epsilon$ could be larger. In short, $\epsilon$ captures the flexibility to adjust the security guarantees of the ROK according to desired implementation characteristics.

It should be appreciated that it is within the present disclosure to use PUFs to generate ROKs, each a PUF ROK. It should be appreciated that the design is based on the idea of using the PUF output to generate a transient key dynamically.

In at least one embodiment of the present disclosure, the system on chip 10 architecture for generating PUF ROKs comprises a number of components:

The processor core (PC) 12 executes the desired application. The PC has access to volatile random access memory (RAM) for implementing the typical C-language execution constructs, such as a stack and heap. The PC 12 contains an interface to a physically distinct crypto core (CC) 110.

The CC 110 is a stand-alone hardware component that provides cryptographic services to the PC 12. The CC 110 may provide a variety of cryptographic function service interfaces to the PC 12, like, for example:

Init($x_0$): an initialization routine that takes an input $x_0$ as a seed value for the PUF 16. There is no return value.

Enc(m): an encryption function that takes a message m as input and returns the encrypted value e(m).

Dec(e(m)): a decryption function that takes a ciphertext as input. Given e(m) repeatedly, this service returns the plaintext m only on the first execution. Subsequent calls to this service for e(m) return Ø.

In at least one embodiment of the present disclosure, the CC 110 has a unidirectional interface with a register Reg 14. In at least one embodiment of the present disclosure, whenever the CC's 110 Init($x_0$) service is invoked, the CC 110 writes $x_0$ (or a value derived from $x_0$, if so desired) into Reg 14.

In an exemplary embodiment of the present disclosure, the CC 12 is configured to poll the PUF 16. In at least one embodiment of the present disclosure, when the CC 12 polls the PUF 16, the value stored in Reg 14 is used as the PUF 16 challenge. In at least one embodiment of the present disclosure, the response is then fed into an error correction unit (ECU) 18. In at least one embodiment of the present disclosure, after performing mode-specific functions, the ECU 18 returns a sanitized PUF 16 output to the CC 12, while simultaneously overwriting the contents of Reg 14. In at least one embodiment of the present disclosure, when decrypting, the write back to Reg 14 is contingent on feedback from CC 12. In this embodiment, Reg 14 would only be overwritten during the function Dec(e(m)) if the decryption was successful.

An exemplary feature of the system on chip of in FIG. 1A is that the components of the PUF 16, ECU 18, and Reg 14 form a feedback loop. In at least one embodiment of the present disclosure, the PUF 16 uses the values stored in the Reg 14 as its input challenge Ci. In such an embodiment, the raw response Ri is run through an error correction routine in the ECU 18 to produce R'i, which is written back into the Reg. In such an embodiment, the cleaned response is also reported to the CC 12 for use in the cryptographic operations.

It should be appreciated that the operation of the ECU depends on the cryptographic function invoked. For example, in at least one embodiment in the case of an encryption operation, the key K is created. In this example, there are no errors to correct. Further, in this example, the ECU 18 uses the raw PUF 16 output as the "correct" value and generates a small amount of error-correcting data. In this example, this data is stored in a local cache that is accessible only to the ECU 18 itself. In this example, when decryption occurs, this data is used to correct any transient bit errors that may have occurred during the PUF execution. It should be appreciated that, in this example, as the error correction occurs before the response is stored in the Reg 14, this design structure ensures that the challenge inputs are correct.

In an exemplary embodiment, the security parameter c is used to specify the size of x0. In an exemplary embodiment to meet the security guarantees dictated by the ROK formalism, x0 must be at least $\lceil -\log 2\epsilon \rceil$ bits in length, with each bit distributed uniformly. It should be appreciated that an exemplary embodiment uses a x0 of a length of at least one bit (for the cases when $\epsilon > \frac{1}{2}$).

In an exemplary embodiment of the system on chip 10, the challenges and responses are the same length. Further, in an exemplary embodiment, Reg 14 consists of a small storage cache of the same size. Additional hardware components may be necessary to implement the PUF ROK design in conditions outside of this exemplary embodiment, and that it is within the scope of this disclosure to implement a hardware design that corresponds with such outside conditions.

In at least one embodiment of the system on chip 10 disclosed in FIG. 1A is that primarily, keys must be used for decryption in the same order as they are created. For example, in at least one embodiment, if two messages m1 and m2 are encrypted, the first encryption would generate K1 and the second creates K2. In this example, to switch to decrypt mode, the Init(x0) primitive would be required to return the Reg 14 to its original state.

In at least one embodiment of the present disclosure, counter n along with the Dec(e(M)) function is received, indicating that the PUF must be polled n times before the appropriate key would be reached. Hence, to decrypt the second message first, the invocation would be the Dec(e(m2), 2) function. After the Dec(e(m1), 2) function is invoked, the contents of Reg 14 would no longer contain x0, and there would be no way for the Dec(e(m1), 1) function to generate K1.

It should be appreciated that a similar problem is that any switch between encryption and decryption may require resetting the contents of Reg 14 and polling the PUF 16 multiple times. For example, assume the user has encrypted three messages m1, m2, and m3. The system on chip 10, in this example, would have generated keys K1, K2, and K3. To decrypt e(m1), Init(x0) restores the Reg 14 to its initial state, and the Dec(e(m1)) function is invoked. After the decryption, Reg 14 is storing R1. In order to encrypt message m4, the PUF 16 would need to be polled two more times to ensure that key K4 is generated.

Figure 1B:
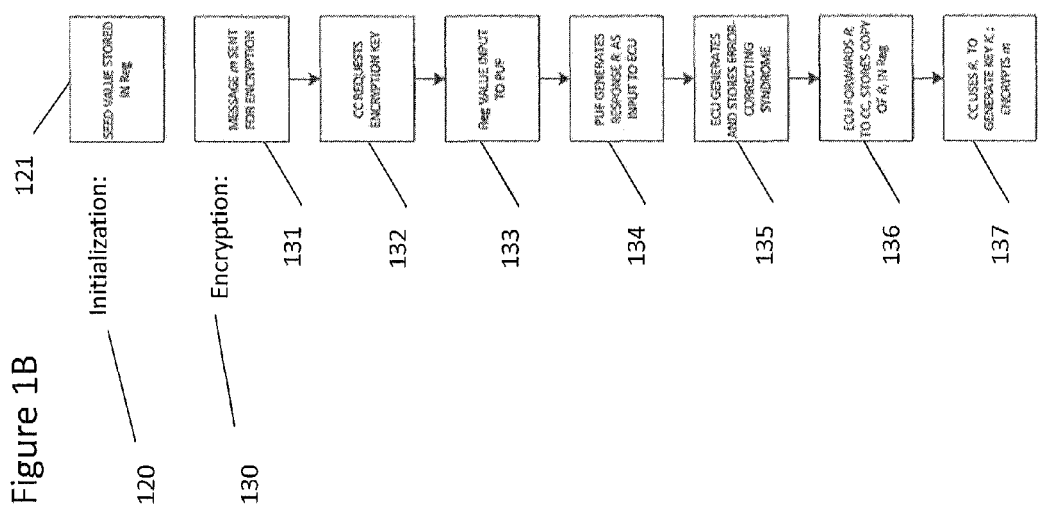
FIG. 1B shows a flow chart of an encryption work flow of an exemplary system on chip for cryptographic functions according to at least one embodiment of the present disclosure.

FIG. 1B shows a flow chart of an encryption work flow of an exemplary system on chip for cryptographic functions according to at least one embodiment of the present disclosure is illustrated. In at least one embodiment of the present disclosure, the encryption work flow of FIG. 1B is performed on the system on chip 10.

In at least one embodiment of the present disclosure, an encryption work flow of an exemplary system on chip for cryptographic functions comprises an initialization sequence 120 and an encryption sequence 130. According to at least one embodiment of the present disclosure, the initialization sequence 120 comprises using Reg 14 to store a seed value in step 121. In at least one embodiment of the present disclosure, the seed value is an initialization value set before performing the encryption sequence 130. The seed value may include, but is not limited to, a pre-set value from the manufacturer of the system on chip, a hash of a user's password, a value remaining from a previous encryption sequence, or any value loaded into Reg 14 prior to the encryption sequence 130 in the work flow according to least one embodiment of the present disclosure.

According to at least one embodiment of the present disclosure, an encryption sequence 130 comprises a message m sent for encryption in step 131, the CC 110 requesting an encryption key in step 131, the value of Reg 14 used as input to the PUF 16 in step 133, the PUF 16 generating a response Ri which is used as input to the ECU 18 in step 134, the ECU 18 generating and storing an error-correcting syndrome for response Ri in step 135, the ECU 18 forwarding Ri to the CC 110 and the ECU 18 storing a copy of R1 in Reg 14 in step 136, and the CC 110 using Ri to generate key Ki, which the CC 110 uses to encrypt message m in step 137.

In at least one embodiment of the present disclosure, in the initialization sequence 120, an initial seed value is placed into Reg 14 in step 121. It should be appreciated that Reg 14 may be a set of registers, a single register, or another storing component. In at least one embodiment of the present disclosure, the CC 110 performs a function to generate the seed value and places the seed value in Reg 14 in step 121. In at least one embodiment of the present disclosure, the initial seed value is hardcoded by a manufacturer.

In at least one embodiment of the present disclosure, in the encryption sequence 130, a message m is sent for encryption in step 131. In at least one embodiment of the present disclosure, m is sent to the CC 110. It should be appreciated that m may be sent to the CC 110 through the external interface of a system on chip, an internal interface to the CC 110 connected to another component, like, such as, a processing core, or another interface configured to send input to the CC 110.

A "message" within the scope of this disclosure includes, but is not limited to, email messages, documents, software, signatures, books, music, instant messages, SMS messages, MMS messages, and any other digital source of information. It should be appreciated that the CC 110 may receive a message of varying size and may store the message or parts thereof in its own cache, an external resource through an interface, RAM, an internal component, or another data structure. As such, the CC 110 may comprise a multitude of components, such as, for example, a processing core, a storage component, an interface, and other components to enable the CC 110 to perform cryptographic functions and interact with the PUF ROK as disclosed herein.

In at least one embodiment of the present disclosure, in the encryption sequence 130, the CC 110 requests an encryption key from the PUF ROK in step 132. In at least one embodiment of the present disclosure, the CC 110 is connected to Reg 14 and configured to perform cryptographic functions. In such an embodiment, the step of requesting an encryption key 132 may be performed by invoking the function Enc(m) in the CC 110.

It should be appreciated that it is within the scope of this disclosure that the initialization sequence 120 is not performed until prior to the CC 110 first requesting the first encryption key in the step 132. In at least one embodiment of the present disclosure, the CC 110, after the step of receiving message m may elect to run the initialization sequence 120, and then request an encryption key in step 132. In such an embodiment, the CC 110 comprises a switch, variable, or other operator configured to store whether the initialization sequence 120 has been performed or has not been performed. In such an embodiment, in the event that the initialization sequence 120 has not been performed, the CC 110 will perform the initialization sequence 120 before requesting a key in step 132. In an exemplary embodiment, the initialization sequence 120 is performed for the first time prior to the encryption sequence 130.

In at least one embodiment of the present disclosure, in the encryption sequence 130, the value stored in Reg 14 is input to the PUF 16 as challenge Ci in step 133. In at least one embodiment of the present disclosure, the first time the encryption sequence 130 is performed, Ci is equal to the seed value stored in Reg 14 during the initialization sequence 120 in step 121. In at least one embodiment of the present disclosure, in subsequent iterations of the encryption sequence 130, the value stored in Reg 14 is not equal to the seed value.

In at least one embodiment of the present disclosure, in the encryption sequence 130 the PUF 16 generates a response Ri as output and Ri is used as input to the ECU 18 in step 134. In at least one embodiment of the present disclosure, in the encryption sequence 130, the ECU 18 generates and stores an error-correcting syndrome for the response Ri. In at least one embodiment of the present disclosure, the ECU 18 stores the error-correcting syndrome internally in, for example, a cache. It is within the scope of the present disclosure that the error-correcting syndrome may be, but is not limited to, Reed-Solomon, Hamming codes, and other error-correcting codes.

In at least one embodiment of the present disclosure, in the encryption sequence 130, the ECU 18 forwards Ri to the CC 110 and stores of a copy of Ri in Reg 14 in step 136. In at least one embodiment of the present disclosure, the first time that the encryption sequence 130 is performed, the step 136 will overwrite the seed value stored in Reg 14 with the response R1. In such an embodiment, the next iteration of the encryption sequence 130 at the step 136 will overwrite R1 stored in Reg 14 with the response R2. Iteratively, each time the encryption sequence 130 is initiated, the step 136 will overwrite Ri−1 stored in Reg 14 with the response Ri.

In at least one embodiment of the encryption sequence 130, the response Ri in the CC 110 is used to generate the key Ki. In such an embodiment, the CC 110 performs the encryption function EK1(m), denoted e in the step 137. An optional step in the encryption sequence 130 or subsequent to the encryption sequence 130 is that the CC 110 passes e to the requesting entity. In at least one embodiment of the present disclosure, the requesting entity may be a processing core, a user through an external input to the CC 110, an additional component through an internal input, or any other interface to the CC 110 configured to receive e.

Figure 1C:
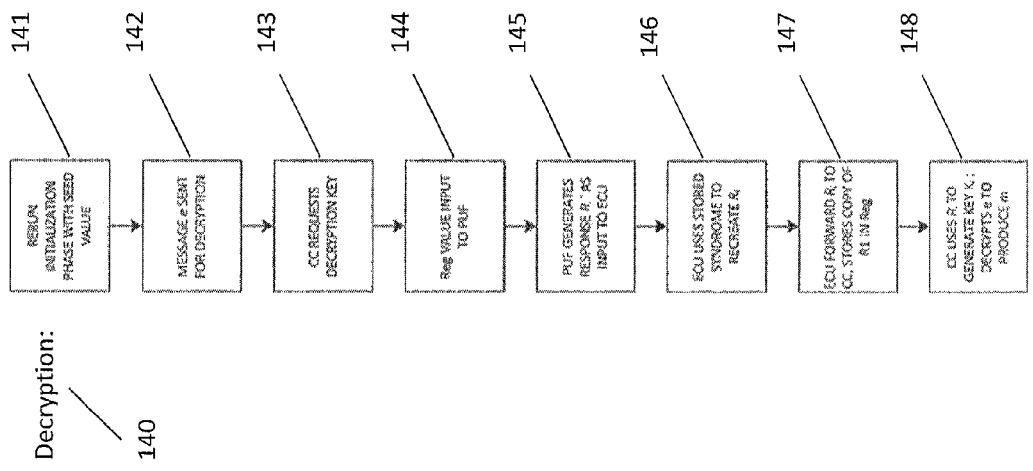
FIG. 1C shows a flow chart of a decryption work flow of an exemplary system on chip for cryptographic functions according to at least one embodiment of the present disclosure.

FIG. 1C shows a flow chart of a decryption work flow of an exemplary system on chip for cryptographic functions according to at least one embodiment of the present disclosure. In at least one embodiment of the present disclosure, the decryption work flow of FIG. 1C is performed on the system on chip 10.

As shown in FIG. 1C, a decryption work flow of an exemplary system on chip for cryptographic functions comprises a decryption sequence 140. In at least one embodiment of the present disclosure, the decryption sequence 140 comprises performing the initialization sequence 120 with the seed value at step 141, receiving an encrypted message e sent to be decrypted as message m 142, the CC 110 requesting a decryption key 143, the value in Reg 14 input to the PUF 16 at step 144, the PUF 16 generating a response R1' which is input to the ECU 18 at step 145, the ECU 18 using the stored syndrome to recreate R1, the ECU 18 forwarding R1 to the CC 110 and storing a copy of R1 in Reg 14, and the CC using R1 to generate a key K1 which is used to decrypt the encrypted message e to produce unencrypted message m at step 146.

In at least one embodiment of the present disclosure, the decryption sequence 140 requires that the initialization sequence 120 is run again to place the seed value in Reg 14 in step 141. In at least one embodiment of the present disclosure, the steps in the decryption sequence 140 subsequent to step 141 mirror the steps in the encryption sequence 130. In such an embodiment, in the decryption sequence 140, the message e is sent for decryption in step 142. Next, in such an embodiment, the CC 110 requests a decryption key in step 143. In this example, the CC 110 requests the decryption key by invoking the function Dec(e) in step 143. In such an embodiment, the value stored in Reg 14 is input to the PUF 16 in step 144 to generate a response Ri'. In such an embodiment, the ECU 18 takes the response Ri' as input and recreates Ri using the stored syndrome in step 146.

It should be appreciated that the stored syndrome to correct Ri' to Ri is the error correcting syndrome stored in step 135 of the encryption sequence 130 for the corresponding index i. In at least one embodiment of the present disclosure, the response Ri is copied into Reg 14 and the response Ri is sent to the CC 110 in step 147. In at least one embodiment of the present disclosure, the CC uses Ri to generate key Ki. In such an embodiment, the CC 110 performs the decryption operation on m to generate e, DK1(e)=m.

In at least one embodiment of the present disclosure, the value stored in Reg 14 changes throughout multiple calls of the Enc function and the Dec function. In at least one embodiment of the present disclosure, each call of the Enc function will perform each step of the encryption sequence 130 which will change the value of Reg 14. For example, when the CC 110 stores a copy of Ri in Reg 14 in step 136, the value stored in Reg 14 is replaced with the value of Ri.

Figure 2A:
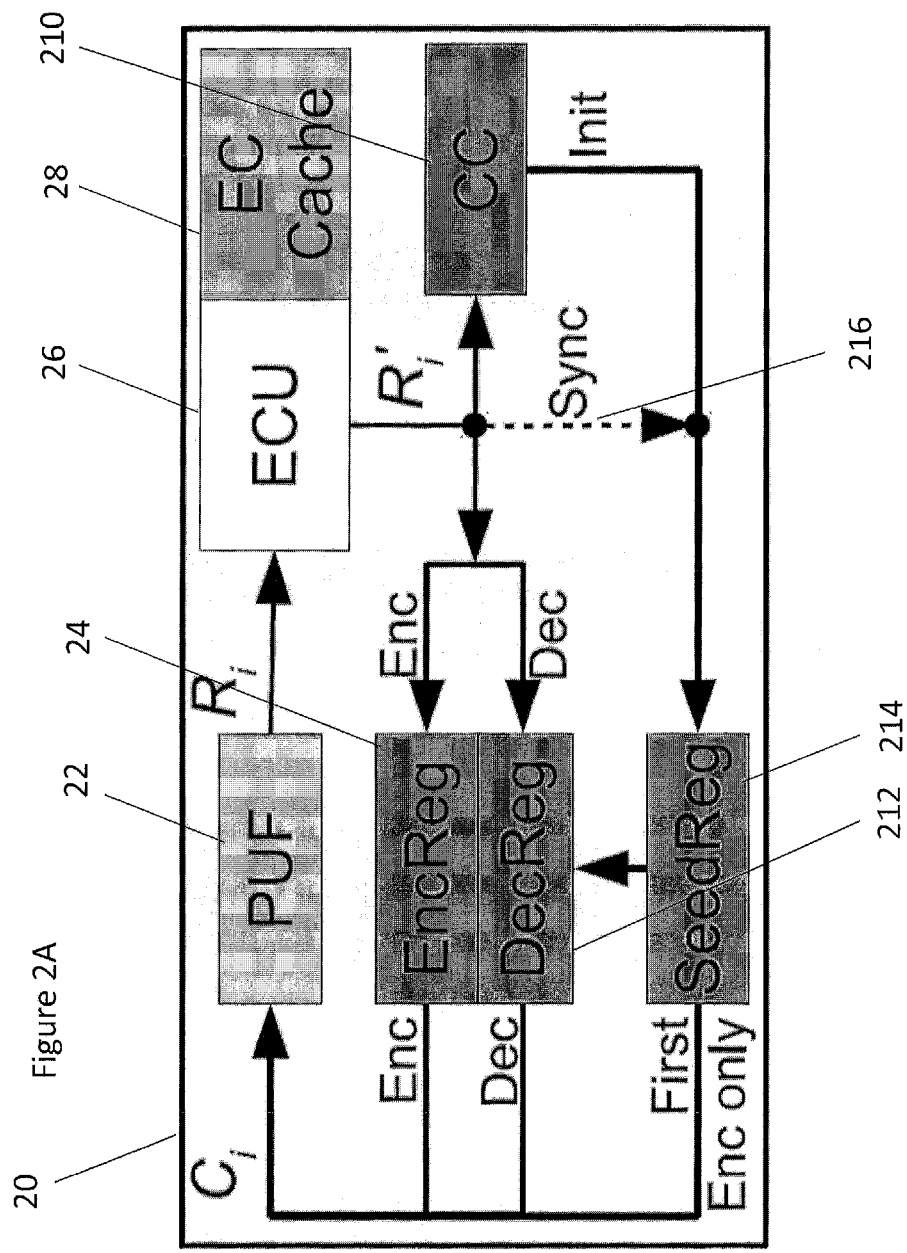
FIG. 2A shows a block diagram of an exemplary system on chip for cryptographic functions according to at least one embodiment of the present disclosure.

Referring now to FIG. 2A, an exemplary embodiment of a system on chip for cryptographic functions is disclosed. In this FIG. 2A, the system on chip 20 comprises a PUF 22, an encryption register (EncReg) 24, an error-correction unit 26, an error-correction cache (EC Cache) 28, a cryptographic core 210, a decryption register (DecReg) 212, and a seed register (SeedReg) 214. The exemplary embodiment of the system on chip 20 the high-level Reg 14 (as disclosed in FIG. 1) is partitioned into distinct registers for processing the challenge input for encryption (EncReg 24) and for decryption (DecReg 212), as well as one that stores the seed value (SeedReg 214). Further, it should be appreciated that this design of FIG. 2A allows the ECU 26 to store n error-correcting codes that can be accessed in arbitrary order from the EC Cache 28. After the first k codes have been used, they can be replaced. In at least one embodiment of the present disclosure, when this occurs, the ECU 26 synchronizes with the SeedReg 214 (as indicated by the Sync action line 216).

In at least one embodiment of the present disclosure, the CC 210 is electronically coupled to the SeedReg 214. In such an embodiment, the SeedReg 214 is electronically coupled to Decreg 212, the EncReg 24, and the PUF 22. In such an embodiment, the PUF 22 is electronically coupled to the ECU 26. In such an embodiment, the ECU 26 is electronically coupled to the EC Cache 28, the EncReg 24, the DecReg 212, and the SeedReg 214 through the Sync action 216 connection. It should be appreciated that the components disclosed herein may be electronically coupled together in other ways in alternative embodiments within this scope of this disclosure to perform as a PUF ROK.

Figure 2B:
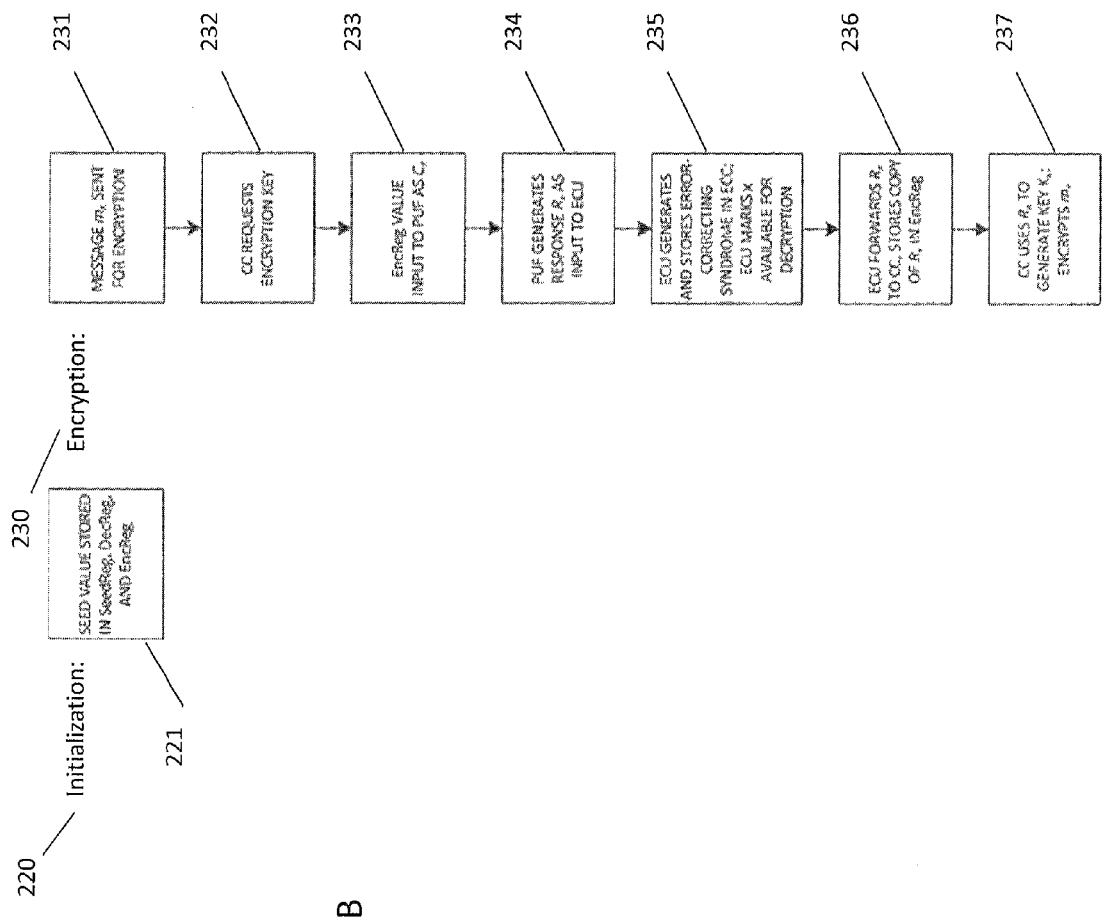
FIG. 2B shows a flow chart of an encryption work flow of an exemplary system on chip for cryptographic functions according to at least one embodiment of the present disclosure.

Referring now to FIG. 2B, a flow chart of an encryption work flow of an exemplary system on chip for cryptographic functions according to at least one embodiment of the present disclosure is illustrated. In at least one embodiment of the present disclosure, the encryption work flow of FIG. 2B is performed on the system on chip 20.

In at least one embodiment of the present disclosure, an encryption work flow of an exemplary system on chip for cryptographic functions comprises an initialization sequence 220 and an encryption sequence 230. According to at least one embodiment of the present disclosure, the initialization sequence 220 comprises placing a seed value into SeedReg 214, DecReg 212, and EncReg 24 in step 221. In at least one embodiment of the present disclosure, the seed value is an initialization value set before performing the encryption sequence 230.

According to at least one embodiment of the present disclosure, an encryption sequence 230 comprises a message mx sent for encryption in step 231, the CC 210 requesting an encryption key in step 231, the value of EncReg 24 used as input to the PUF 22 in step 233, the PUF 22 generating a response Rx which is used as input to the ECU 26 in step 234, the ECU 26 generating and storing an error-correcting syndrome for response Rx in the EC Cache 28 and marking x as available for decryption in step 235, the ECU 26 forwarding Rx to the CC 210 and the ECU 26 storing a copy of Rx in EncReg 24 in step 236, and the CC 210 using Rx to generate key Kx, which the CC 210 uses to encrypt message mx in step 237.

In at least one embodiment of the present disclosure, in the encryption sequence 230, a message mx is sent for encryption in step 231. In at least one embodiment of the present disclosure, mx is sent to the CC 210. It should be appreciated that mx may be sent to the CC 210 through the external interface of a system on chip, an internal interface to the CC 210 connected to another component, like, such as, a processing core, or another interface configured to send input to the CC 210.

It should be appreciated that the CC 210 may receive a message of varying size and may store the message or parts thereof in its own cache, an external resource through an interface, RAM, an internal component, or another data structure. As such, the CC 210 may comprise a multitude of components, such as, for example, a processing core, a storage component, an interface, and other components to enable the CC 210 to perform cryptographic functions and interact with the PUF ROK as disclosed herein.

In at least one embodiment of the present disclosure, in the encryption sequence 230, the CC 210 requests an encryption key from the PUF ROK in step 232. In at least one embodiment of the present disclosure, the CC 210 is connected to EncReg 24 and configured to perform cryptographic functions. In such an embodiment, the step of requesting an encryption key 232 may be performed by invoking the function Enc(mx) in the CC 210.

It should be appreciated that it is within the scope of this disclosure that the initialization sequence 220 is not performed until prior to the CC 210 first requesting the first encryption key in the step 232. In at least one embodiment of the present disclosure, the CC 210, after the step of receiving message $m_x$ may elect to run the initialization sequence 220, and then request an encryption key in step 232. In such an embodiment, the CC 210 comprises a switch, variable, or other operator configured to store whether the initialization sequence 220 has been performed or has not been performed. In such an embodiment, in the event that the initialization sequence 220 has not been performed, the CC 210 will perform the initialization sequence 220 before requesting a key in step 232. In an exemplary embodiment, the initialization sequence 220 is performed for the first time prior to the encryption sequence 230.

In at least one embodiment of the present disclosure, in the encryption sequence 230, the value stored in EncReg 24 is input to the PUF 22 as challenge C, in step 233. In at least one embodiment of the present disclosure, the first time the encryption sequence 230 is performed, $C_x$ is equal to the seed value stored in SeedReg 214 and EncReg 24 during the initialization sequence 220 in step 221. In at least one embodiment of the present disclosure, in subsequent iterations of the encryption sequence 230, the value stored in EncReg 24 is not equal to the seed value, whereas the value stored in SeedReg 214 is equal to the seed value.

In at least one embodiment of the present disclosure, in the encryption sequence 230 the PUF 22 generates a response $R_x$ as output and $R_x$ is used as input to the ECU 26 in step 234. In at least one embodiment of the present disclosure, in the encryption sequence 230, the ECU 24 generates and stores an error-correcting syndrome for the response $R_x$. In at least one embodiment of the present disclosure, the ECU 26 stores the error-correcting syndrome in the EC Cache 28 in step 235. In at least one embodiment of the present disclosure, the ECU 24 marks the index x as available for decryption in the EC Cache 28 in step 235. It should be appreciated that marking the index x as available for decryption in the EC Cache 28 enables the decryption sequence 240 to verify that the decryption key for index x has only been used to decrypt a single message in the CC 210.

In at least one embodiment of the present disclosure, in the encryption sequence 230, the ECU 26 forwards $R_x$ to the CC 210 and stores of a copy of $R_x$ in EncReg 24 in step 236. In at least one embodiment of the present disclosure, the first time that the encryption sequence 230 is performed, the step 236 will overwrite the seed value stored in EncReg 24 with the response $R_1$. In such an embodiment, the next iteration of the encryption sequence 230 at the step 236 will overwrite $R_1$ stored in EncReg 24 with the response $R_2$. Iteratively, each time the encryption sequence 230 is initiated, the step 236 will overwrite $R_{x-1}$ stored in EncReg 24 with the response $R_x$.

In at least one embodiment of the encryption sequence 230, the response $R_x$ in the CC 210 is used to generate the key $K_x$. In such an embodiment, the CC 210 performs the encryption function $E_{K1}(m_x)$, denoted e in the step 237. An optional step in the encryption sequence 230 or subsequent to the encryption sequence 230 is that the CC 210 passes e to the requesting entity. In at least one embodiment of the present disclosure, the requesting entity may be a processing core, a user through an external input to the CC 210, an additional component through an internal input, or any other interface to the CC 210 configured to receive e.

Figure 2C:
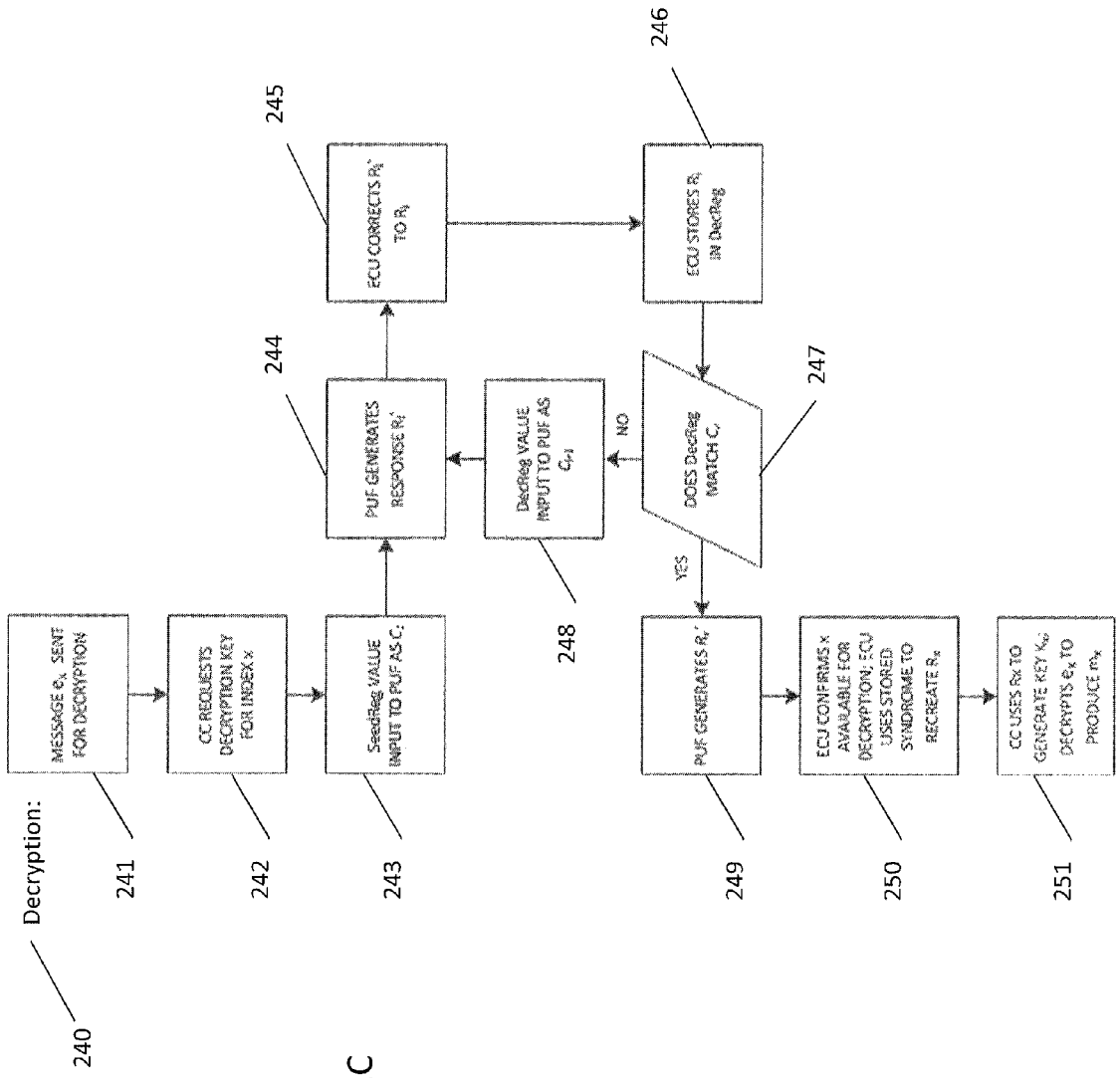
FIG. 2C shows a flow chart of a decryption work flow of an exemplary system on chip for cryptographic functions according to at least one embodiment of the present disclosure.

Referring now to FIG. 2C, a flow chart of a decryption work flow of an exemplary system on chip for cryptographic functions according to at least one embodiment of the present disclosure is shown. In at least one embodiment of the present disclosure, the decryption work flow of FIG. 2C is performed on the system on chip 20 and comprises the decryption sequence 240.

According to at least one embodiment of the present disclosure, the decryption sequence 240 comprises receiving an encrypted message ex in step 241, the CC 210 requesting a decryption key for index x in step 242, and the value of SeedReg 214 used as input to the PUF 22 in step 243. Additionally, a feedback loop occurs in the system on chip 20 in the decryption sequence 210 to obtain the correct response Rx, the feedback loop comprising the PUF 22 generating the response Ri' 244, the ECU 26 correcting Ri' to Ri in step 245, the ECU 26 storing Ri in DecReg 212 in step 246, and determining whether the value of DecReg 212 matches the necessary challenge value Cx in step 247. If not, the loop continues by using the value of DecReg 212 as input to the PUF 22 referenced, referenced as challenge value Ci+1, and then starting back at the step of the PUF generating a response Ri' in step 244.

In at least one embodiment of the present disclosure, the decryption sequence 240 comprises receiving an encrypted message ex in step 241. In at least one embodiment of the present disclosure, the message ex indicates the appropriate index x to use to generate the correct key Kx needed to decrypt the message ex to the clear-text message mx.

In at least one embodiment of the present disclosure, the function Dec(e(mx), x) is invoked by the CC 210 to request the decryption key of index x from the PUF ROK in step 242. In such an embodiment, the noisy response Rx' is properly generated by polling the PUF ROK and iterating through the feedback loop x times. For example, if the function Dec(e(m7), 7) is invoked by the CC 210, then the feedback loop will be iterated seven times in order to generate R7', the proper response from the PUF 22. In such an example, the noisy response R7' steps through the decryption sequence 240 to generate the proper key K7, which is used by the CC 210 to decrypt the message ex to mx.

In at least one embodiment of the present disclosure, the decryption sequence 240 comprises the step 243 of inputting the value stored in SeedReg 214 as input to the PUF 22 as C1. In such an embodiment, the value stored in SeedReg 214 is the seed value populated during the initiation sequence 220. In at least one embodiment of the present disclosure, using the seed value as input to the PUF 22 generates the noisy response R1' from the PUF 22 in step 244, which corresponds to the response R1 generated during the first iteration of the encryption sequence 230.

In at least one embodiment of the present disclosure, in the decryption sequence 240, the ECU 26 corrects the noisy response from step 244 by applying the error-correcting syndrome stored in the EC Cache 28 during the encryption sequence for the current iteration of the feedback loop. For example, if the current iteration is the third iteration of the feedback loop, then the error-correction syndrome stored in the EC Cache 28 for index 3 is applied to the noisy response R3' to generate the clean response R3. In this example, R3 generated through step 245 is the same R3 generated during the third time that the encryption sequence 230 was performed. In at least one embodiment of the present, the responses Ri are stored in DecReg in step 246.

In at least one embodiment of the present disclosure, the feedback loop repeats on the system on chip 20 until the value of DecReg 212 matches the challenge value Cx. In at least one embodiment of the present disclosure, once the value of DecReg 212 matches the challenge value Cx, the challenge value Cx is used as input to the PUF 22 to generate Rx' 249, the ECU 26 confirms that x is available for decryption and uses the stored syndrome to recreate Rx 250, and the CC 210 uses Rx to generate key Kx which is used to decrypt the message ex to product the unencrypted message mx 251.

Figure 2D:
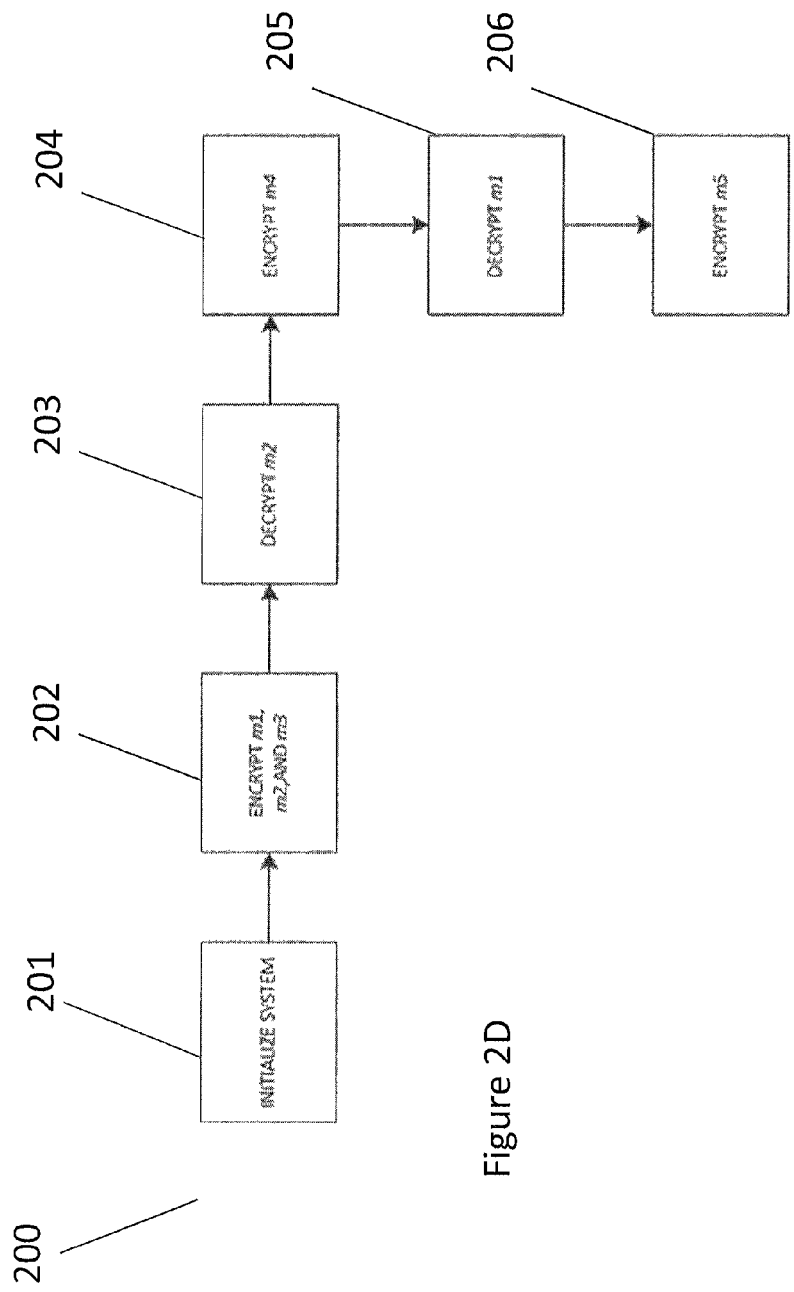
FIG. 2D shows a flow chart of a sample encryption and decryption work flow of an exemplary system on chip for cryptographic functions according to at least one embodiment of the present disclosure.

Referring now to FIG. 2D, in an exemplary embodiment of the system on chip 20, the operation of the PUF ROK architecture can be as follows. In one example, a work flow 200 according to at least one embodiment of the present disclosure could include initializing the system 201, encrypt m1, m2, and m3 202, decrypting m2 203, encrypting m4 204, decrypting m1 205, and encrypting m5 206. In such an example, the number of error-correcting codes stored, n, could be equal to four.

In this example, in the step of the user initializing the system 201, the user initializes the system with a function Init(x0). In the next step of the example work flow 200, a requests that three messages, m1, m2, and m3 be encrypted 202 is made. In at least one embodiment of the present disclosure, in the step of encrypting m1, m2, and m3 202, the keys K1, K2, and K3 are derived from the PUF responses R1, R2, and R3, respectively. In this example, the ECU 26 stores error correcting codes EC1, EC2, and EC3 in the EC Cache 28.

In the next step of the example work flow 200, a request that Message m2 is decrypted is made 203 by invoking the Dec(e(m2), 2) function. In at least one embodiment of the present disclosure, the contents of SeedReg 214 are copied into DecReg 212, and the PUF 22 is polled twice to generate R2 and the corresponding K2. In this example, the ECU 26 marks EC2 as invalid, assuming the decryption is successful.

In the next step of the example work flow 200, a request that Message m4 be encrypted 204 is made, using R4 and K4. In this example, EC4 is generated and stored in the EC Cache 28.

In the next step of the example work flow 200, a request that Message m1 is decrypted 205 by the Dec(e(m1), 1) function. At this point in the example work flow 200, as both EC1 and EC2 have become invalid, the ECU 26 initiates the Sync action 216.

In at least one embodiment of the present disclosure, during the Sync action 216, the ECU 26 takes control of the PUF 22 feedback loop. In this example, the PUF 22 is polled twice, using the contents of SeedReg 214 as the challenge input (x0). As a result, responses R1 and R2 are generated, and R2 is ultimately stored in SeedReg 214. In this example, as a result of Sync action 216, the part of EC Cache 28 that was used to store EC1 and EC2 is now marked as available.

In the last step of the example work flow 200, a request is made to encrypt m5 206. In this example, the Enc(m5) function is invoked, using the contents of EncReg 24 as the challenge input. In this example, the corresponding EC5 is then stored in one of the newly available slots in EC Cache 28.

While this approach in this example addresses the complication of using keys out of order, a simple extension makes the design even more powerful. Consider the example where a key is needed n times, rather than just once. For example, if Alice needs Bob to encrypt ten messages on her behalf, she could either use 10 ROKs or she could employ, for lack of a better term, a read ten-times-key. In at least one embodiment of the present disclosure, the integrated EC Cache 28, could accommodate this request by storing the ECi codes ten times. In at least one embodiment of the present disclosure, the codes would then become invalid after all 10 slots in the EC Cache 28 have been marked as such.

It should be appreciated that the system on chip 20 may be applied to a variety of functions, like symmetric cryptography, public-key cryptography, digital signatures, and digital rights management. It should be appreciated that the CC 210 in each function may act differently depending on what will be the cryptographic application.

In an exemplary embodiment, the system on chip 20 is used in symmetric key cryptographic applications. In at least one embodiment of the present disclosure, the function Enc(m) invoked, where m indicates the message to be encrypted. In at least one embodiment of the present disclosure, the CC 210 then issues the Init(x0) routine, which writes the value x0 into a register, such as, for example, EncReg 24 or DecReg 212. In at least one embodiment of the present disclosure, the PUF 22 then uses x0 as C1 and generates R1, which is passed to the ECU 26. In at least one embodiment of the present disclosure, the ECU 26 then generates the necessary error-correcting codes EC1 to ensure the key is later recoverable, even if the noisy output of the PUF produces a small number of bit errors.

In at least one embodiment of the present disclosure, to guarantee a strong key from R1, the CC 210 applies a cryptographic hash. That is, to generate a 256-bit AES key, the CC 210 computes K1=H(R1), where H is the SHA-256 hash function. In an exemplary embodiment, a hash function is included to add entropy in the key generation process. For example, if Ri and Rj (the responses produced by two different PUF 22 pollings) differ by only a single bit, H(Rj) and H(Ri) will have a Hamming distance of 128 bits on average. As a result, in this example, even if an attacker is able to recover the key in this example just by observing the plaintext and ciphertext, the hash prevents modeling the PUF 22, as doing so may require the attacker to create a pre-image of the hash.

In at least one embodiment of the present disclosure, once the CC 210 has polled the PUF 22 and generated the key, the encrypted message e(m) is output from the CC 210. Later, when the recipient wishes to decrypt the message (which can only be done once), the command Dec(e(m)) is issued to the CC 210. The CC 210 then resets the register with the Init(x0) routine, and polls the PUF 22 to recreate the key. In at least one embodiment of the present disclosure, the decrypted message then is returned as output from the CC 210.

It should be appreciated that there are multiple methods within the scope of the present disclosure to generate the initiation value, x0. In one approach, which depends only on the device itself, would be to take the time-stamp is when the Init routine is invoked, and use x0=H(ts). In another approach, a user's password may be used and hashed similarly. In another approach, x0 could be hardcoded by the manufacturer of the PUF ROK. It should be appreciated that it is within the scope of this disclosure to generate x0 in other ways.

Although this example references the system on chip 20 from FIG. 2A, it should be appreciated that it is within the scope of this disclosure that the architecture may be used in symmetric cryptography with any PUF ROK architecture disclosed herein, such as, for example, the PUF ROK architecture in FIG. 1.

In an exemplary embodiment, the system on chip 20 may be used in public-key cryptography, such as, for example, in the use of digital signatures. In this setting, we start with the assumption that the CC 210 contains the necessary parameters for the public key computations. For instance, if the RSA cryptosystem is used, the CC 210 knows (or can create) the two large prime numbers p and q such that n=pq.5 The goal, then, is to generate a pair (pk, sk), where pk denotes a public key and sk denotes the corresponding private key.

In at least one embodiment of the present disclosure, in contrast to the symmetric key approach, the CC 210 does not need to generate the ROK twice. As such, in at least one embodiment of the present disclosure, the Init(x0) routine is optional. However, the CC 210 still polls the PUF 22 to generate the pair of keys. It should be appreciated that a challenge with using a PUF 22 to create a public key pair is how to generate a bit string that is long enough. A strong RSA key, for example, is at least 2048 bits long. It should be appreciated that creating a 2048-bit output from the PUF 22 may require a prohibitively large circuit design.

In an exemplary embodiment, the CC 210 buffers a series of PUF results. For example, if the PUF 22 produces a 256-bit output, the CC 210 could use Ri as bits 0-255, Ri+1 as bits 255-511, and so forth. Once the CC 210 has polled the PUF 22 to get a sufficient number of random bits, the next challenge is to convert this bit string into a strong key using an algorithm for public key encryption, like, for example RSA.

In an example of at least one embodiment of the present disclosure, let e denote the candidate key that the CC 210 has received from the PUF 22. In order to use e as an RSA key, e must be coprime to $\phi(n)=(p1)(q1)$. By applying the Euclidean algorithm, the CC 210 can compute the greatest common divisor $g=\gcd(e,\phi(n))$. If $g=1$, e and $\phi(n)$ are coprime, and e can be used as is. Otherwise, $e'=e/g$ can be used. The secret key sk, then becomes e or e' as appropriate. To compute the public key pk, the CC 210 computes the modular multiplicative inverse of sk by using the extended Euclidean algorithm. That is, in one example, the CC 210 computes d such that sk·d≡1 (mod φ(n)). In example, this value d then becomes the public key pk. Given this key pair (pk, sk), the PUF ROK can be used in multiple ways. For example, the command Sign(m) could be issued to the CC 210, requesting a cryptographic signature. In this example, after generating (pk, sk), the CC 210 uses sk to sign m, returning the signature and the public key pk to PC. pk can then be used by a third party to verify the signature.

In at least one embodiment of the present disclosure, the command Gen could be issued, which tells the CC 210 to generate the key pair. In at least one embodiment of the present disclosure, instead of using the keys immediately, the CC 210 may store sk and return pk. In one example, a third party wishing to send an encrypted message to the PC could use pk as needed. Then, in one example, the Dec(m) function is invoked to have the CC 210 decrypt the message. In an exemplary embodiment, sk would be discarded during the Gen procedure. Later, when the decryption occurs, the sk would be recreated, making the public key PUF ROK work similarly to the symmetric key version as disclosed herein.

In an exemplary embodiment, consider the case where the third party needs assurance that the public key pk did, in fact, origin from the PUF ROK. It is within the scope of the disclosure that this can be accomplished if the CC 210 contains a persistent public key pair, similar to the Endorsement Key (EK) stored in a Trusted Platform Module (TPM). In addition to providing the pk, the CC 210 could also return SignEK(pk), denoting the signature of the pk under this persistent key. This technique provides the necessary assurance, as the persistent key is bound to the CC 210. It should be appreciated that this embodiment is improved with a key management infrastructure similar to existing TPM-based attestation schemes.

It should be appreciated that it is within the scope of this disclosure to integrate the PUF ROK architecture into devices similar to USB thumb drives. As such, it should be appreciated that the devices could be passed between users in close proximity with relative ease.

In at least one embodiment of the present disclosure with remote users, a PUF ROK for remote use would function in a manner similar to a TPM. In one example, Bob's TPM-like PUF ROK would generate a public key that Alice would use for encryption. Later, in this example, Bob's device would generate the corresponding private key to decrypt the message. Clearly, in this example, Alice would need assurance that the public key actually came from a PUF ROK. In this example, an approach similar to TPMs is used to provide such assurance. That is, in this example, the PUF ROK device would require a certificate created by the manufacturer, storing a persistent private key generated by the manufacturer. In this example, this key would then be used to sign all PUF ROKs from that device, and Alice could confirm the signature with the manufacturer's public key.

In short, in at least one embodiment of the present disclosure, the PUF ROK device infrastructure for remote users mirrors TPM behavior with one major exception in such an embodiment, the device is trusted to enforce the behavior that the PUF ROK can only be used once, which does not exist in TPMs. It should be appreciated that the PUF ROKs could clearly be integrated into any system on chip design that is functionally similar to a TPM.

It should be appreciated that there are multiple applications for PUF ROKs within the scope of this disclosure. In one example, PUF ROKs may be used in one-time programs using a one-time use key. In another example, PUF ROKs may be utilized in delegated signatures. For example, if Alice has a persistent key skA, she could encrypt this key with the PUF 22 ROK as e(skA). In this example, Bob would then provide this encrypted key to the PUF ROK, which decrypts it and uses the decrypted key to sign a single document on Alice's behalf.

In at least one embodiment of the present disclosure, PUF ROKs could also be used to generate self-destructing messages. In one example, if Alice has a portable PUF ROK device, she could use the PUF ROK device to generate Enc (m). After receiving the message in this example, Bob could use the device to decrypt the message. In this example, subsequent attempts to decrypt the message would fail, as the register would no longer store the necessary challenge input.

In another example, consider the scenario of usage control. In this example, Bob has a public key PUF ROK device that contains the TPM-like endorsement key EK. In this example, Bob could use the device to retrieve the signed pk, which he sends to Alice. In this example, Alice, after confirming the signature, uses the key to encrypt the protected resource, sending the result to Bob. In this example, Bob can then use the sk stored on the PUF ROK to access the resource. In this example, once the CC 210 uses sk, this key is no longer accessible, and access to the resource is revoked.

Figure 3:
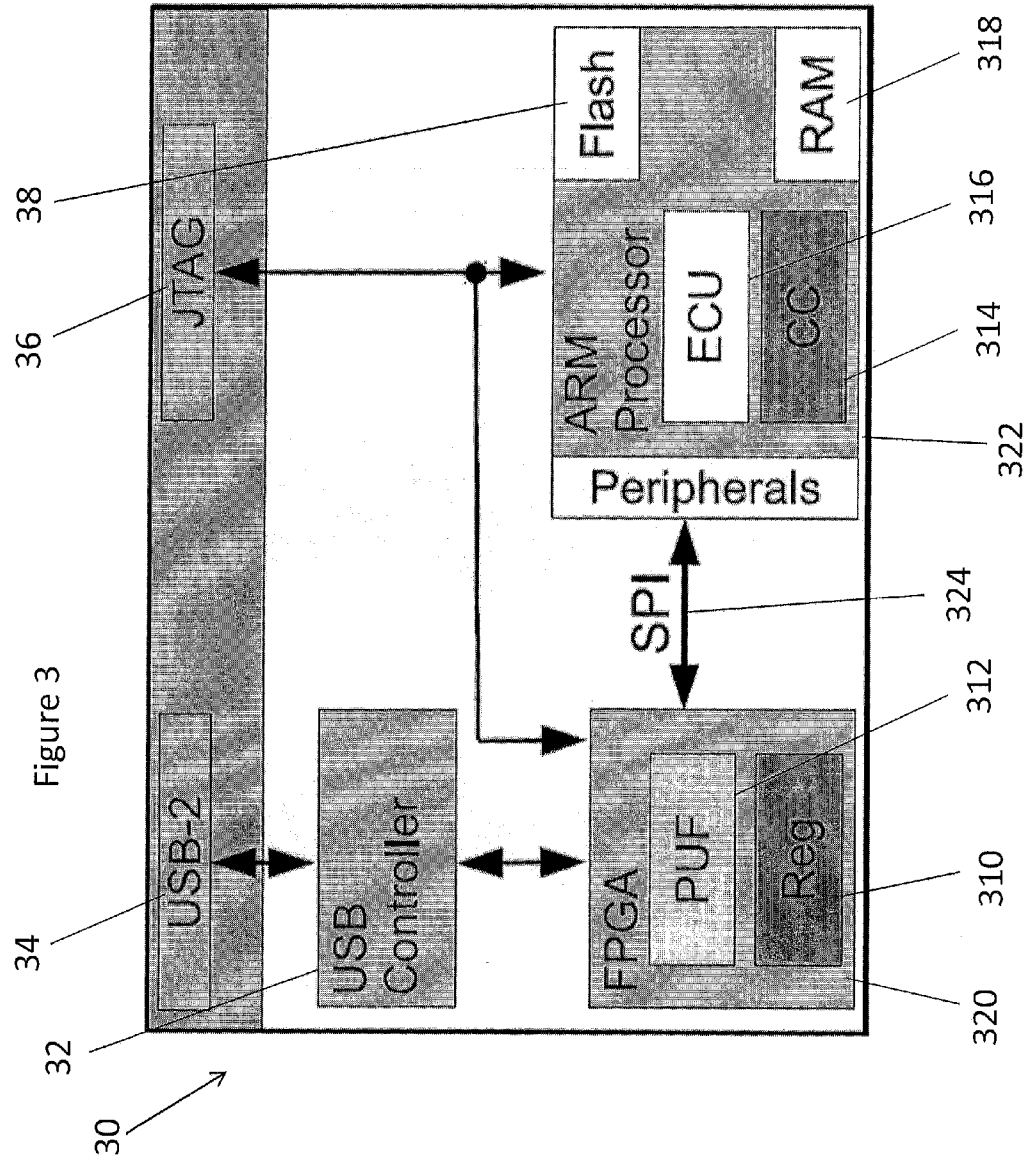
FIG. 3 shows a system on chip for cryptographic functions according to at least one embodiment of the present disclosure.

Referring now to FIG. 3, in at least one embodiment, the system on chip may be implemented in part software and part hardware on a board 30. In one example, the PUF ROK design may be partly implemented using a KNJN Saxo-L. In this example, the board features an Altera Cyclone EP1C3T100 field-programmable gate array (FPGA) 320 alongside an NXP LPC2132 ARM processor 322. It should be appreciated that the FPGA 320 and the ARM processor 322 may comprise any FPGA and ARM and the foregoing examples are merely examples.

In at least one embodiment, the FPGA 320 and ARM 322 are directly connected via a Serial Peripheral Interface (SPI) 324. The board also offers a USB-2 adaptor 34, in addition to a JTAG adaptor 36. In addition, the form factor of the board 30 measures 44×60 mm, making it highly portable.

In at least one example of at least one embodiment of the present disclosure, the FPGA 320 may be used for components that require a hardware implementation, like, for example, the PUF 22. In one example, a small PUF 22 and register on the FPGA 320 may be implemented to capture the essence of the feedback loop. In this example, all other components, including the error-correcting unit (ECU) 316 and the crypto core (CC) 314 may be implemented in software on the ARM processor 322.

In one example, the PUF 312 design may consist of 32 1-bit ring oscillator PUFs. In an exemplary embodiment in this example, each of these circuits consists of a ring oscillator constructed from 37 inverting gates. Nevertheless, it should be appreciated that any number of inverting gates may be used. However, the use of smaller inverting gates may increase the amount of error correction required by the ECU 316.

In one example, the output from the ring oscillators is linked to 20-bit counters that controlled by a 16-bit timer. In this example, the timer is synchronized with a 24 MHz clock, indicating that the timer would expire (as a result of an overflow) after 2.73 ms. When the timer expires in one example, the values in the counters are compared, producing a 1 or 0 depending on which counter had the higher value. In at least one example uses 2060 of the 2910 (71%) logic cells available on the FPGA 320, thereby producing 32 bits of output in the PUF 312. In at least one example, to generate larger keys, the ARM processor polled the PUF multiple times, caching the result until the key size was met.

It should be appreciated that regardless of the size of the PUF 312 in this embodiment, error correction may be necessary. In an exemplary embodiment, Reed-Solomon error correction is used. In this embodiment, Reed-Solomon (RS)(n, k) codes operate as follows. A string of k symbols, each m bits in length, is concatenated with an n–k syndrome, where n=2–1. Based on this syndrome, when the input is used again, the codes can correct up to (n–k)/2 corrupted symbols. In this embodiment with a 32-bit output of the PUF 312, RS(15, 9) codes may be used.

In at least one embodiment of the present disclosure, the PolarSSL cryptographic library may be adapted for execution on the ARM 322 processor. This open source library is designed to be small enough for use in embedded devices. It should be appreciated that it is within the scope of the disclosure to use any cryptographic function set for execution in the PUF ROK, like, for example, OpenSSL or a custom-built cryptographic library.

In at least one embodiment of the present disclosure, the use of the FPGA 320 may be discarded. In at least one embodiment of the present disclosure, ARM softcore designs may be placed within the FPGA itself to simplify the board 30 circuitry. It should be appreciated that the disclosure in FIG. 3 is only an example of an implementation of the PUF ROK architecture and that components disclosed herein may be interchanged for similar components. For example, Verilog code of at least one embodiment of the present disclosure according to FIG. 3 is disclosed in Appendix A. It should be appreciated that the Verilog code disclosed in Appendix A is only an example of at least one embodiment of the present disclosure.

Figure 4:
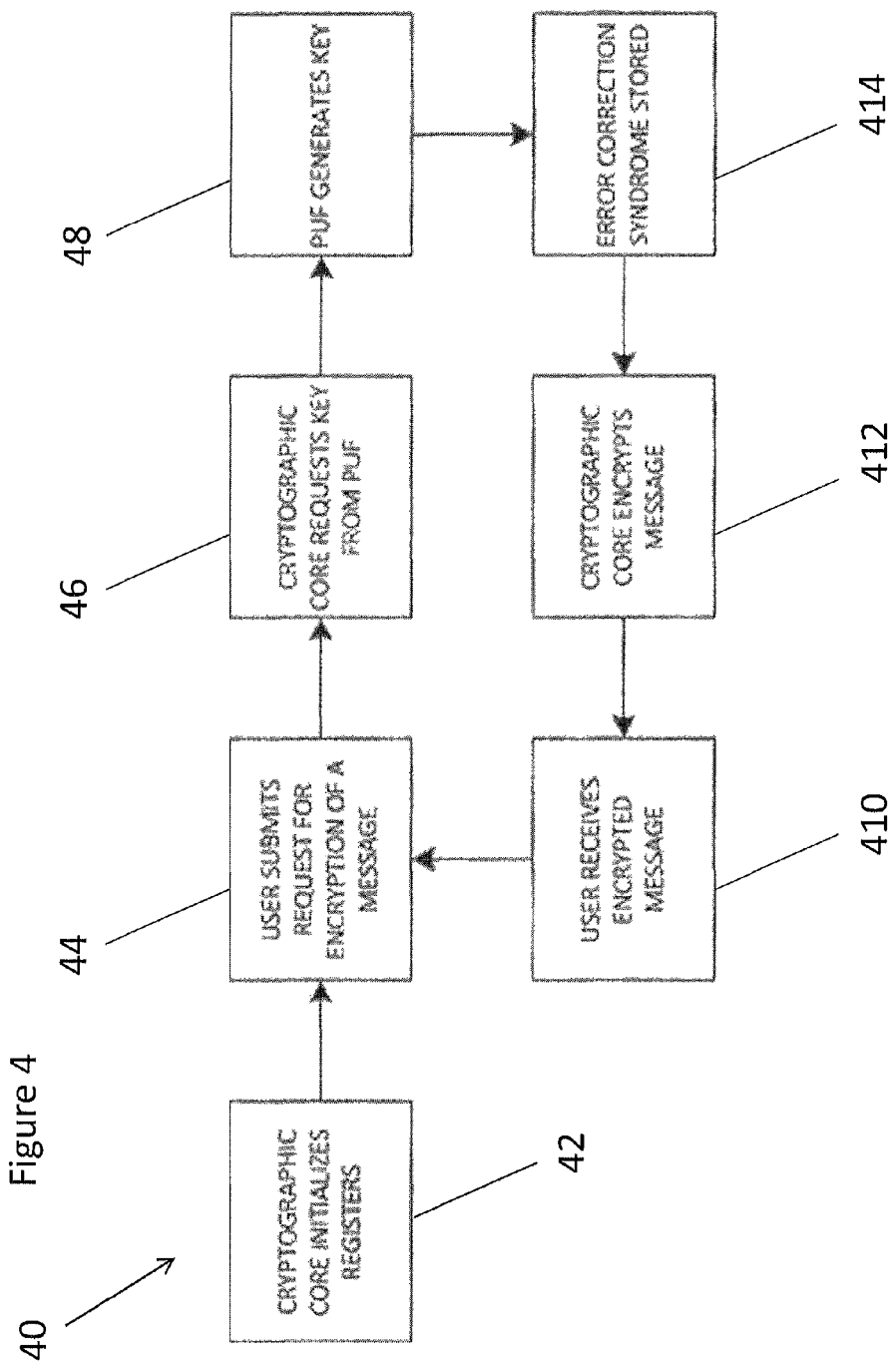
FIG. 4 shows a flow chart for a method for securely performing cryptographic functions using read-N keys according to at least one embodiment of the present disclosure.

Referring now to FIG. 4, disclosed is a method 40 for securely encrypting messages using a PUF ROK. The method comprises a cryptographic core configured to initialize the registers 42, a user submitting a request for encryption of a message 44, a cryptographic core configured to request a key from a PUF 46, a PUF configured to generate a key 48, storing an error-correction syndrome 414, a cryptographic core configured to encrypt the message 412, and the user receiving the encrypted message 410.

It should be appreciated that the method 40 may be implemented with any message. It should be appreciated that the method 40 utilizes the PUF ROK architecture within the scope of this disclosure.

In at least one embodiment of the step of the cryptographic core initializing registers 42, a cryptographic core initializes one or more registers with an initial seed value. The initial seed value may comprise any value used to initialize the PUF ROK, including, but not limited to, a hardcoded value by the manufacturer, a value generated by the user at first run-time using entropy inputted by the user or obtained from the system itself, or any other value.

In an exemplary embodiment of the step of the cryptographic core initializes the registers, a cryptographic core initializes three registers with a seed value. In an exemplary embodiment, similar to the system on chip shown in FIG. 2A, the registers would be a seed register (SeedReg), encryption register (EncReg), and a decryption register (DecReg). In another embodiment, only a single register (Reg) is initialized by the cryptographic core in the step of the cryptographic core initializes registers. It should be appreciated that the cryptographic core may include, but is not limited to, a processing core residing on a system on chip capable of cryptographic functions, a processing core within an embedded system capable of cryptographic functions, or any processing core on any architecture that may perform cryptographic functions.

In at least one embodiment of the step of the user submitting a request for encryption of a message 44, the user submits a request to the cryptographic core comprising a message and a request to encrypt the message. In an exemplary embodiment, the user has a direct interface through a processing core to the cryptographic core. It should be appreciated that the input to the cryptographic core may include any input, like, for example USB-1, USB-2, FireWire, JTAG, and any other external interface. It should also be appreciated that the input to the cryptographic core may include an internal input from the user, like an internal bus to a processing core or an interconnect between components in a system.

In at least one embodiment, in the step of the cryptographic core requests key from the PUF 46, the cryptographic core uses the initialized value from one of the registers as input into a PUF to generate an output to be used as a key. In an exemplary embodiment, the first time that the user requests an encryption of a message, the value in EncReg is used as input to the PUF for generation of the key. In another embodiment with only one register, the value of the register may be used as input to the PUF for generation of the key.

In at least one embodiment, in the step of the PUF generating a key 48, the PUF generates an output which is a key. It should be appreciated that the PUF may include a PUF as disclosed herein or any PUF implemented in hardware.

In an exemplary embodiment, in the step of removing errors from the key, the key is passed through an error-control unit to perform an error-correction code to remove noisy data from the key to produce a corrected key. The error-correction code may include, but is not limited to the Reed Solomon function. It should be appreciated that the error-correction code may be applied in any processing core within a system on chip or external to the system on chip, like, for example, in software.

In at least one embodiment, in the step of the cryptographic core encrypts the message, the cryptographic core performs an encryption function on the message using the corrected key. In an exemplary embodiment, the corrected key is passed to the EncReg and used as input to the PUF in the next iteration of the step of the cryptographic core requests key from the PUF 46. In an exemplary embodiment, a feedback loop is created that inputs any freshly created corrected key from the PUF into the PUF as input for the next iteration. In at least one embodiment, in the step of the user receiving the encrypted messages 410, the user receives the encrypted message through the interface to the cryptographic processing core.

Figure 5:
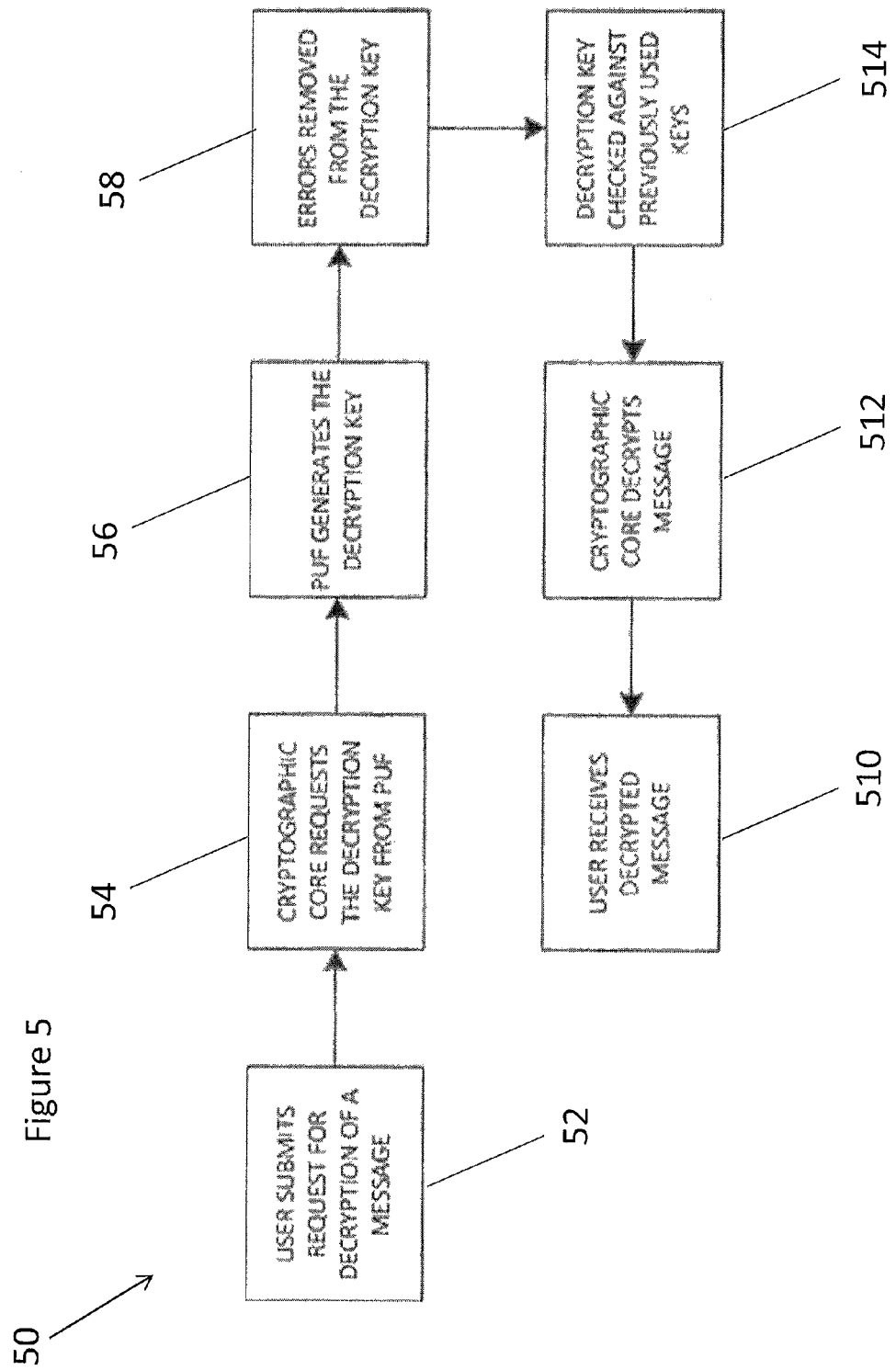
FIG. 5 shows a flow chart for a method for securely performing cryptographic functions using read-N keys according to at least one embodiment of the present disclosure.

Referring now to FIG. 5, the method of decrypting a message using a PUF ROK 50 comprises a user submitting a request for decryption of a message 52, a cryptographic core requesting the decryption key from a PUF 54, a PUF generating the decryption key 56, removing errors from the decryption key 58, checking the decryption against previously used keys 514, decrypting the message in the cryptographic core 512, and presenting the decrypted message to the user 510.

In at least one embodiment, in the step of a user submitting a request for decryption of a message 52, a user submits a message for decryption. In an exemplary embodiment, the user submits a message for decryption in addition to a decryption counter that identifies to the cryptographic core the number of iterations necessary in order to obtain the decryption key from the PUF.

In at least one embodiment, in the step of the cryptographic core requests the decryption key from the PUF 54, the cryptographic core pushes the contents of a register into the PUF as a seed value to generate the decryption key. In an exemplary embodiment, the cryptographic core evaluates the decryption counter to determine the number of iterations of input into the PUF in order to obtain the decryption key.

In at least one embodiment, in the step of the PUF generating the decryption key 56, the PUF takes input from the cryptographic core and produces an output as a key. In an exemplary embodiment, the PUF receives the contents of a register as input to produce the decryption key. In at least one embodiment, in the step of removing errors from the decryption key 58, an error-correction codes is applied to the key to produce a corrected key. In an exemplary embodiment, the cryptographic core determines whether the number of times that input has been provided to the PUF matches the decryption counter. In this embodiment, if the number of times that input has been provided to the PUF does not match the decryption counter, the corrected key is inputted into the PUF to generate a new key. In this embodiment, error-correction codes are applied to the new key to generate a new corrected key, and the cryptographic core determines whether the number of times that input has been provided to the PUF matches the decryption counter. In this embodiment, the cryptographic core may perform this feedback loop with enough times to match the decryption counter in order to obtain the correct decryption key for the message.

In at least one embodiment, in the step of checking the decryption key against previously used keys 514, the decryption key is evaluated against a set of previously used keys to determine whether the decryption key has been used to decrypt a message previously. In an exemplary embodiment, a cache stores the keys used to decrypt messages in the cryptographic core and an error-control core evaluates whether the key has been used to decrypt a message before. In an exemplary embodiment, the decryption key is not passed to the cryptographic core to decrypt the message in the event that the key has been used to decrypt a message previously.

In at least one embodiment, if the decryption key is passed to the cryptographic core to decrypt the message, the cache is updated to reflect that the decryption key has been used. In another embodiment, the cache may allow the decryption key to be used more than one time depending on user preferences.

In at least one embodiment in the step of the cryptographic core decrypting the messages 512, the cryptographic core decrypts the message using the decryption key. In at least one embodiment, in the step of the user receiving the decrypted message 510, the cryptographic core passes the decrypted message to the user through an interface.

In an exemplary embodiment, the methods disclosed in FIG. 4 and FIG. 5 may be occurring at the same time in a single PUF ROK architecture. In such an exemplary embodiment, the PUF ROK uses a queue to determine which step in the respective method to perform at any given time. The queue may be a first-in-first-out queue, a first-in-last-out queue, or any other queuing structure. In such an exemplary embodiment, three registers (EncReg, DecReg, and SeedReg) act together in feed forward to set the state of the PUF ROK for an encryption or decryption operation from a user. In an exemplary embodiment, the PUF ROK uses the three registers to track which key index was last used for decryption.

In one example, if the key index corresponds to a key that is generated iteratively from the PUF subsequent to the key stored in DecReg, then the process starts using the key stored in DecReg and iterates through the PUF ROK until the correct decryption key is generated. In another example, if the key index corresponds to a key that is generated iteratively from the PUF prior to the key stored in DecReg, then the value in SeedReg is moved into DecReg and iterates through the PUF ROK until the correct decryption key is generated.

In an exemplary embodiment, encryption operations may occur at any time in the queue by using the value of the key stored in EncReg. In such an embodiment, after an encryption key is generated through the PUF and subsequently corrected, the encryption key is placed into EncReg to act as a seed value for the PUF in the next encryption operation.

While this disclosure has been described as having various embodiments, these embodiments according to the present disclosure can be further modified within the scope and spirit of this disclosure. This application is therefore intended to cover any variations, uses, or adaptations of the disclosure using its general principles. A practitioner may determine in a particular implementation that a plurality of components of the disclosed assembly may be combined in various ways, or that different components or different variations of the components may be employed to accomplish the same results. A practitioner may also determine in a particular implementation that a plurality of steps of the disclosed method may be combined in various ways, or that different steps or variations of the steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

We claim:

1. A system for cryptographic functions, the system comprising:
   a cryptographic core;
   a seed register electronically coupled to the cryptographic core;
   a physically unclonable function (PUF) electronically coupled to the seed register, the PUF configured to receive a seed value as an input and to generate a key as an output;
   an error-correction core electronically coupled to the PUF and the cryptographic core, the error-correction core configured to receive the key as an input and to transmit the key to the cryptographic core;
   a decryption register electronically coupled to the error-correction core and the seed register, the decryption register being configured to receive the key from the error-correction core; and
   an encryption register electronically coupled to the error-correction core, the encryption register being configured to receive the key from the error-correction core.

2. The system of claim 1, wherein the error-correction core is configured to generate an error-correction syndrome from the key, the system further comprising:
   an error-correction cache electronically coupled to the error-correction core, the error-correction cache configured to store the error correction syndrome.

3. The system of claim 1, wherein the cryptographic core is configured to perform cryptographic functions.

4. The system of claim 1, wherein the cryptographic core is electronically coupled to an external interface, and wherein the cryptographic core configured to receive a message through the external interface, to perform a cryptographic function on the message using the key, and to send the message through the external interface.

5. The system of claim 1, wherein the cryptographic core is configured to generate a hash using the key and to use the hash as a private key in symmetric cryptography.

6. The system of claim 1, further comprising:
   a processing core electronically coupled to the cryptographic core, the processing core configured to send at least one input to the cryptographic core, the at least one input comprising a message, a cryptographic function, and an index value;

a feedback circuit comprising the error-correction core, the decryption register, the encryption register, and the PUF, the feedback circuit configured to iteratively execute each component of the feedback circuit; and an index key, the index key generated by iteratively executing each component of the feedback circuit as many times as the index value;

wherein the cryptographic core is configured to perform a cryptographic function on the message using the index key to generate a cryptographic message.

7. The system of claim 1, further comprising:

a buffer within the cryptographic core configured to combine a plurality of keys into a combined key; and a public key and a private key forming a key pair, wherein the cryptographic core is configured to generate the key pair using the combined key as input.

8. The system of claim 7, further comprising:

a digital signature comprising a communication signed by the private key, wherein the public key is configured to verify the authenticity of the digital signature through public key cryptography.

9. The system of claim 1, wherein the system is implemented on a single integrated circuit.

10. A method for performing cryptographic functions using read-N keys, the method comprising the steps of:

receiving at least one encryption input, each at least one encryption input comprising an encrypt function and a message;

performing an encryption key generation process for at least one encryption input, the encryption key generation process comprising the steps of:

providing a seed value to a physically unclonable function (PUF), generating an output value from the physically unclonable function (PUF) using the seed value, storing an error-correction syndrome generated from the output value, transmitting the output value to the cryptographic core, storing the output value in a plurality of registers, and updating an iteration counter.

11. The method of claim 10, wherein the encryption key generation process further comprises the step of:

producing an encrypted message by executing the encrypt function on the message using the output value.

12. The method of claim 11, further comprising the step of:

repeating the encryption key generation process for each of the at least one encryption inputs, wherein the output value of an iteration of the encryption key generation process is used as the seed value in a later iteration of the encryption key generation process.

13. The method of claim 10, wherein the error-correction syndrome is generated by applying a Reed-Solomon function.

14. The method of claim 10, wherein the encryption input comprises a private key generation request, the method further comprising the steps of:

generating a private key using the output value; and producing an encrypted communication using the private key.

15. The method of claim 14, further comprising the steps of:

transmitting the encrypted communication; and decrypting the communication.

16. The method of claim 10, wherein the encryption input comprises a key-pair generation request, the method further comprising the step of:

generating a public and private key pair using the output value.

17. A method for performing cryptographic functions using read-N keys, the method comprising the steps of:

receiving at least one decryption input, each at least one decryption input comprising an encrypted message, a request to decrypt the encrypted message, and an index value;

performing a decryption key generation process for each of the at least one decryption inputs, the decryption key generation process comprising the steps of:

a. providing a decryption seed value to a physically unclonable function (PUF), b. generating a first output value from the physically unclonable function (PUF) using the decryption seed value, c. using an error-correction syndrome to generate a second output value from the first output value, d. copying the second output value into a register, and e. updating an iteration counter.

18. The method of claim 17, wherein the decryption key generation process further comprises the steps of:

comparing the index value to the updated iteration counter; and if the iteration counter is less than the index value, repeating the steps a through e.

19. The method of claim 17, further comprising the step of:

performing a decrypt function on the encrypted message using the second output value.

20. A method for delegating digital signatures using a hardware-based physically unclonable function (PUF), the method comprising the steps of:

setting an initial seed value for a PUF and a cryptographic processing core electronically coupled to the PUF;

generating a candidate key from the PUF and the cryptographic processing core;

using the candidate key to produce a public and private key pair in the cryptographic processing core;

placing a digital signature on a communication using the private key in the cryptographic processing core;

destroying the initial seed value and the private key in the cryptographic processing core;

making the public key available to a recipient of the digitally signed communication;

transferring the digitally signed communication to the recipient;

verifying the authenticity of the digital signature on the communication using the public key.

\* \* \* \* \*